(12) United States Patent
Nagata et al.

(10) Patent No.: US 9,914,058 B2
(45) Date of Patent: Mar. 13, 2018

(54) GAME-PROVIDING DEVICE AND SOFTWARE PROGRAM FOR GAME-PROVIDING DEVICE

(71) Applicant: DeNA Co., Ltd., Tokyo (JP)

(72) Inventors: Minehiro Nagata, Tokyo (JP); Yoshiki Watabe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 224 days.

(21) Appl. No.: 14/868,145

(22) Filed: Sep. 28, 2015

(65) Prior Publication Data

US 2016/0089604 A1 Mar. 31, 2016

(30) Foreign Application Priority Data

Sep. 29, 2014 (JP) ................. 2014-198297

(51) Int. Cl.
*A63F 13/67* (2014.01)
*A63F 13/822* (2014.01)
*A63F 13/2145* (2014.01)

(52) U.S. Cl.
CPC .......... *A63F 13/67* (2014.09); *A63F 13/2145* (2014.09); *A63F 13/822* (2014.09)

(58) Field of Classification Search
CPC ..... A63F 13/67; A63F 13/2145; A63F 13/822
See application file for complete search history.

(56) References Cited

FOREIGN PATENT DOCUMENTS

JP 2008-142532 6/2008

*Primary Examiner* — Werner Garner
(74) *Attorney, Agent, or Firm* — Procopio, Cory, Hargreaves & Savitch LLP

(57) ABSTRACT

If a carryover condition has been satisfied such that the attacks against an enemy character, which are carried out by the player character in a first battle scene against the enemy character that appears in said first battle scene, can be extended to other enemy characters, the carryover processing module sequentially executes a process that uses a first attack value generated as a result of the player character's attacks against the enemy character in the first battle scene to offset defeat parameter values required to defeat enemy characters configured in each of the enemy characters appearing in each battle scene provided subsequent to said first battle scene, skips the appearance of the enemy characters whose defeat parameter values have been reduced to zero and, additionally, causes the subsequently appearing enemy character to appear in a state in which the defeat parameter value of said enemy character has been offset.

10 Claims, 24 Drawing Sheets

| Item ID (Player Character ID) | Defeat Parameter Value (HD) | Attack Strength | Blow Strength | ... |
|---|---|---|---|---|
| P001 | 1000 | 200 | 500 | ... |
| P002 | 1300 | 250 | 800 | ... |
| P003 | 800 | 300 | 1000 | ... |
| P004 | 2000 | 150 | 500 | ... |
| : | : | : | : | ... |

| Item ID (Enemy Character ID) | Defeat Parameter Value (HP) | Break Parameter Value | Attack Strength | Blow Resistance | Break Period (seconds) | ... |
|---|---|---|---|---|---|---|
| E001 | 400 | 400 | 100 | 300 | 10 | ... |
| E002 | 300 | 800 | 120 | 300 | 20 | ... |
| E003 | 1000 | 800 | 300 | 500 | 30 | ... |
| E004 | 5000 | 1000 | 500 | 1000 | 40 | ... |
| . | . | . | . | . | . | ... |

FIG. 6

| Stage ID | Battle Scene ID | Enemy Character ID | Carryover Condition | Overbreak Condition | ... |
|---|---|---|---|---|---|
| s001 | b001 | E001 | xx | xx | ... |
| s002 | b002 | E002 | xx | xx | ... |
| s003 | b003 | E003 | xx | xx | ... |
| s004 | b004 | E004 | xx | xx | ... |
| . | . | . | . | . | ... |

FIG. 7

|        | Affinity Parameter Value |         |         |         |     |
|--------|--------|---------|---------|---------|-----|
|  from  | to 310a | to 310b | to 310c | to 310d | ... |
| 310a   | -       | 10      | 8       | 2       | ... |
| 310b   | 1       | -       | 3       | 8       | ... |
| 310c   | 8       | 3       | -       | 5       | ... |
| 310d   | 6       | 5       | 5       | -       | ... |
| .      | .       | .       | .       | .       | ... |

FIG. 15

| Condition (affinity parameter value) | Success Timing Control Information ||
|---|---|---|
| | Range (%) | Speed |
| 10 | 70 or more to 100 or less | normal |
| 9  | 75 or more to 100 or less | normal |
| 8  | 80 or more to 100 or less | normal |
| .  | . | . |
| 1  | 95 or more to 100 or less | normal |
| .  |   |   |

FIG. 16

| Condition (affinity parameter value) | Success Timing Control Information ||
|---|---|---|
| | Range (%) | Speed |
| 10 | 70 or more to 100 or less | slow |
| 9  | 70 or more to 100 or less | normal |
| 8  | 70 or more to 100 or less | normal |
| .  | ... | . |
| 1  | 70 or more to 100 or less | fast |
| .  |   | . |

FIG. 17

| Conditions | | Success Timing Control Information | |
|---|---|---|---|
| Affinity Parameter Value | Attack Strength | Range (%) | Speed |
| 10 | 81-100 | 70 or more to 100 or less | slow |
| | 61-80 | | normal |
| | . | | . |
| . | . | . | . |
| 1 | 81-100 | 95 or more to 100 or less | slow |
| | 61-80 | | normal |
| | . | | . |
| . | . | . | . |

FIG. 27

GAME-PROVIDING DEVICE AND SOFTWARE PROGRAM FOR GAME-PROVIDING DEVICE

The present application claims the benefit of foreign priority under 35 USC 119 to Japanese Patent Application No. 2014-198297, filed on Sep. 29, 2014, the contents of which is incorporated herein in its entirety by reference.

BACKGROUND

1. Technical Field

The present invention relates to a game-providing device and a software program (e.g., non-transitory computer-readable medium containing instructions stored in a storage and executable on a hardware device). for a game-providing device.

2. Related Art

In a well-known prior-art arrangement, a game device executes a game in which a player character acting according to a player's instructions is pitted against an enemy character, and the character that reduces a predetermined parameter configured in the opponent character to a preset value as a result of mutual attacks is declared the winner. Multiple stages ranging from Stage 1 to Stage n (where n is an integer of 2 or more) are included, and combat with a different enemy character takes place in each of said stages (e.g., see Patent Document 1).

PRIOR-ART DOCUMENTS

Patent Documents

[Patent Document 1]
Japanese Patent Application Publication No. 2008-142532

Problems to be Solved by the Invention

However, in prior-art games composed of the above-described multiple stages, the player had to engage in combat with a different enemy character in every stage, and even if the player's player character was considerably stronger than the enemy character, the player had to clear the stages by defeating each enemy character. In addition, in some of the games, a single stage was composed of several battle scenes featuring a different enemy character in each one. In such a case, the battle scenes had to be cleared one by one, which caused skilled players to become bored with the game.

SUMMARY

The present invention has been devised by taking the above-described circumstances into consideration, and it is an object of the invention to provide a technology that saves the player's time and effort in the battle scenes of games that include multiple independent battle scenes, each respectively featuring an enemy character that appears therein as an opponent of a player character.

The present invention provides a game-providing device comprising: a game management control module that sequentially provides a player with a game that includes multiple independent battle scenes, each respectively featuring an enemy character that appears therein as an opponent of a player character such that, when the player clears one of the battle scenes, the next battle scene is provided to the player; a carryover condition determination module that determines whether or not a carryover condition has been satisfied such that the attacks against the enemy character, which are carried out by the player character in a first battle scene against the enemy character that appears in said first battle scene, can be extended to other such enemy characters that are configured to appear in battle scenes other than the aforementioned first battle scene; a carryover processing module that, once the carryover condition has been satisfied, sequentially executes a process that uses a first attack value generated as a result of the player character's attacks against the enemy character in the aforementioned first battle scene to offset defeat parameter values required to defeat enemy characters that are configured in each of the enemy characters appearing in each of the battle scenes provided subsequent to said first battle scene, skips the appearance of the enemy characters whose defeat parameter values have been reduced to zero and, additionally, causes the subsequently appearing enemy character to appear in a state in which the defeat parameter value of said enemy character has been offset.

It should be noted that arbitrary combinations of the constituent elements above, as well as items produced by transforming the wording of the present invention into methods, apparatus, systems, recording media, computer programs (e.g., non-transitory computer-readable medium containing instructions stored in a storage and executable on a hardware device), and the like are valid as embodiments of the present invention.

Effects of the Invention

The present invention can provide a technology that saves the player's time and effort in the battle scenes of games that include multiple independent battle scenes, each respectively featuring an enemy character that appears therein as an opponent of a player character.

BRIEF DESCRIPTION OF THE DRAWINGS

FIG. 6 A diagram illustrating another exemplary partial internal configuration of the item information storage module in accordance with Embodiment 1.

FIG. 7 A diagram illustrating an exemplary internal configuration of the stage information storage module in accordance with Embodiment 1.

FIG. 15 A diagram illustrating an exemplary internal configuration of the affinity parameter value storage module in accordance with Embodiment 3.

FIG. 16 A diagram illustrating an exemplary internal configuration of the success timing control information storage module in accordance with Embodiment 3.

FIG. 17 A diagram illustrating another exemplary internal configuration of the success timing control information storage module in accordance with Embodiment 3.

FIG. 27 A diagram illustrating another exemplary internal configuration of the success timing control information storage module in accordance with Embodiment 3.

DETAILED DESCRIPTION

Figure 1:
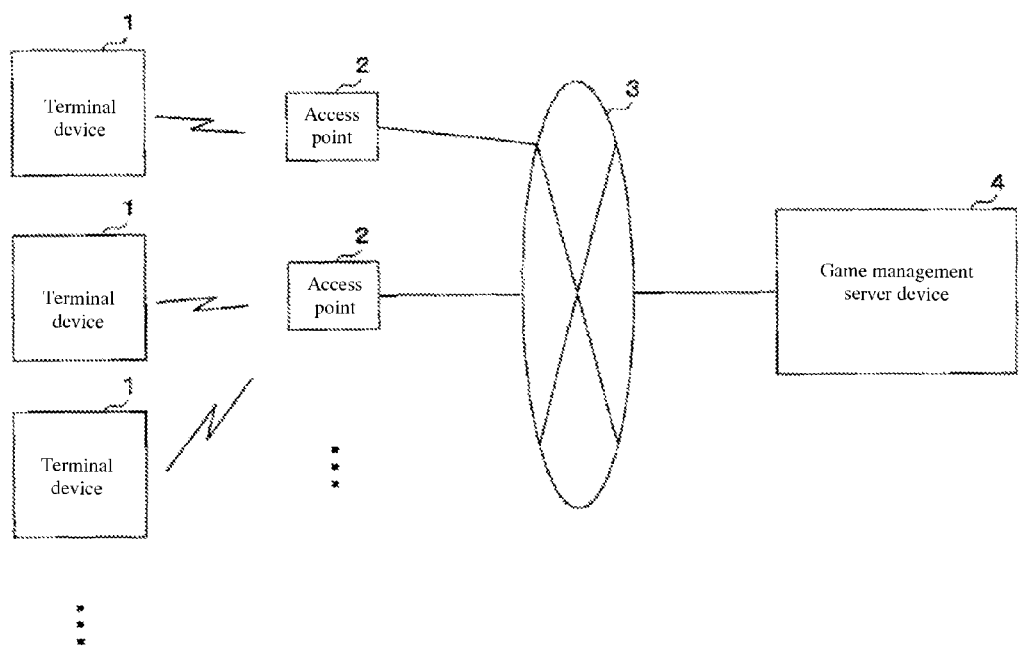
FIG. 1 A block diagram illustrating an exemplary system configuration in accordance with the present embodiment.

Embodiments of the present invention will be described below with reference to the drawings. It should be noted that like reference numerals will be used to refer to like constituent elements in all the drawings, and descriptions thereof will be omitted as appropriate.

Embodiment 1

FIG. 1 is a block diagram illustrating an exemplary system configuration in accordance with the present embodiment.

The system includes terminal devices 1 belonging to players (users), access points 2 (such as mobile wireless base stations or Wi-Fi stations), a network 3 (such as the Internet), and a game management server device 4, which manages (controls) games used by multiple players for game play over the network. The game management server device 4 is connected to the terminal devices 1 of the multiple players over the network 3. Examples of the terminal devices 1 include mobile phones, smartphones, game consoles, personal computers, touch pads, electronic book readers, and other information processing equipment. This embodiment will be described with reference to the game management server device 4 as the game-providing device.

Figure 2:
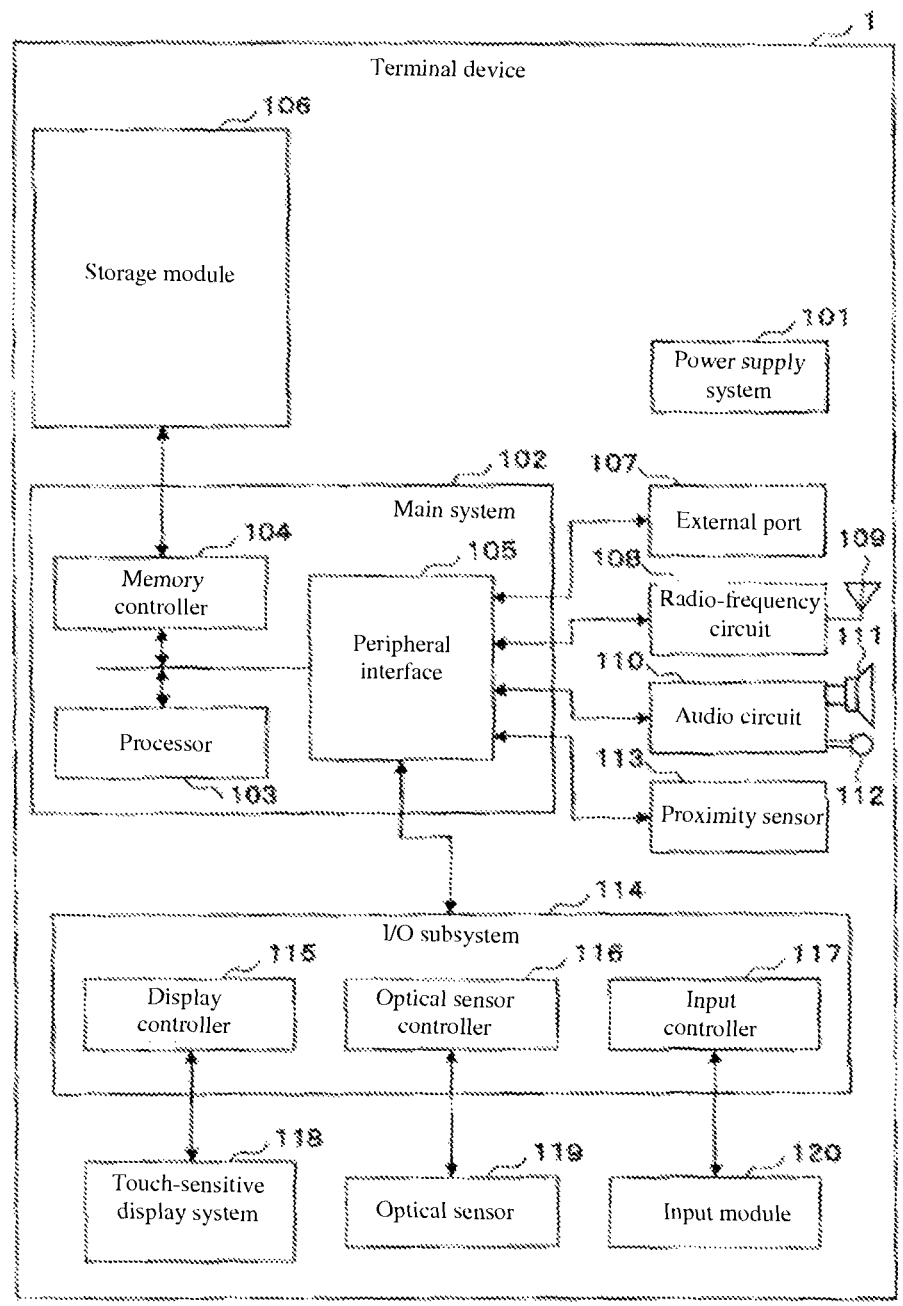
FIG. 2 A block diagram illustrating an exemplary hardware configuration of the user terminal device in accordance with the present embodiment.

FIG. 2 is a block diagram illustrating an exemplary hardware configuration of the terminal device 1 in accordance with the present embodiment.

The terminal device 1 includes a power supply system 101, a main system 102, a storage module 106, an external port 107, a radio-frequency circuit 108, an antenna 109, an audio circuit 110, a speaker 111, a microphone 112, a proximity sensor 113, an I/O subsystem 114, a touch-sensitive display system 118, an optical sensor 119, and an input module 120. The main system 102 includes a processor 103, a memory controller 104, and a peripheral interface 105. The I/O subsystem 114 includes a display controller 115, an optical sensor controller 116, and an input controller 117.

Figure 3:
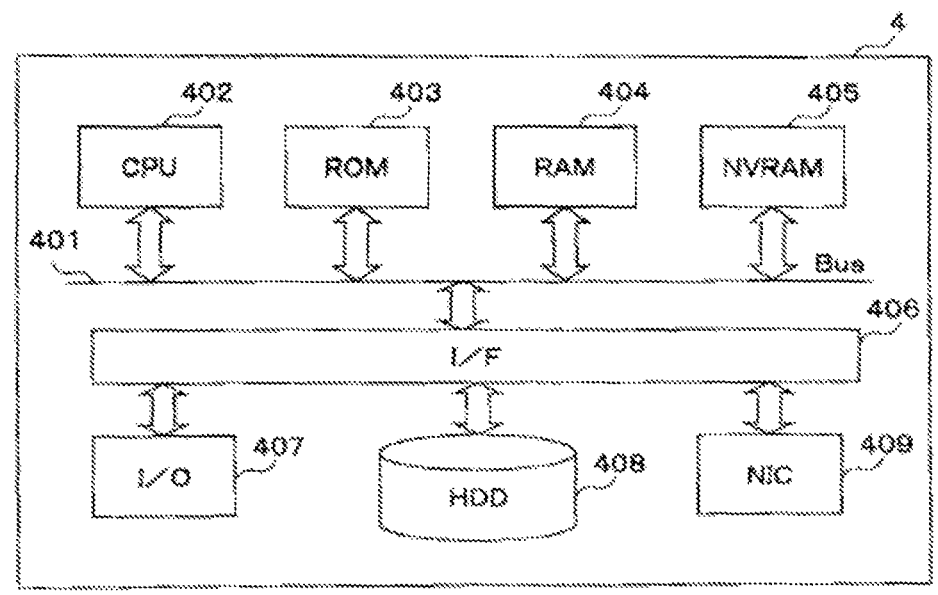
FIG. 3 A block diagram illustrating an exemplary hardware configuration of the game management server device in accordance with the present embodiment.

FIG. 3 is a block diagram illustrating an exemplary hardware configuration of the game management server device 4 in accordance with the present embodiment.

The game management server device 4 includes a CPU (Central Processing Unit) 402, a ROM (Read Only Memory) 403, a RAM (Random Access Memory) 404, and an NVRAM (Non-Volatile Random Access Memory) 405, which are connected to a system bus 401, an I/F (Interface) 406, I/O (Input/output Devices) 407, such as a keyboard, a mouse, a monitor, a CD/DVD (Compact Disk/Digital Versatile Disk) drive and the like, which are connected to the I/F 406, a HDD (Hard Disk Drive) 408, an NIC (Network Interface Card) 409, and so on.

Figures 4, 5:
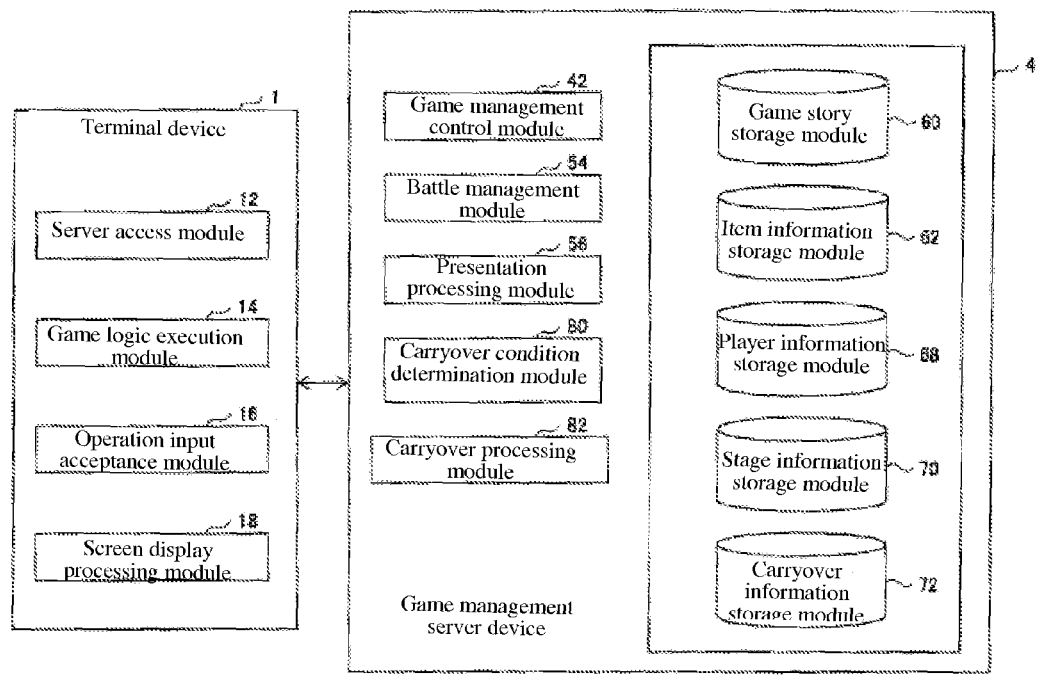
FIG. 4 A block diagram illustrating an exemplary functional configuration of the terminal device and game management server device in accordance with Embodiment 1.
FIG. 5 A diagram illustrating an exemplary partial internal configuration of the item information storage module in accordance with Embodiment 1.

FIG. 4 is a block diagram illustrating the functional configuration of the terminal device 1 and the game management server device 4 in accordance with the present embodiment.

The terminal device 1 includes a server access module 12, a game logic execution module 14, an operational input acceptance module 16, and a screen display processing module 18.

The operational input acceptance module 16 accepts operational input from a player (user) operating the terminal device 1.

The game logic execution module 14 progresses through the game by executing screen transitions in response to operational input accepted by the operational input acceptance module 16.

If access to the game management server device 4 is required during processing by the game logic execution module 14, the server access module 12 transmits a request to the game management server device 4 and accepts processing results, and the like, in response.

The screen display processing module 18 provides an on-screen display under the control of the game logic execution module 14.

The game management server device 4 includes a game management control module 42, a battle management module 54, a presentation processing module 56, a carryover condition determination module 80, a carryover processing module 82, a game story storage module 60, an item information storage module 62, a player information storage module 68, a stage information storage module 70, and a carryover information storage module 72.

The game story storage module 60 stores game stories and the like that are used to execute the games executed in the present embodiment.

The game management control module 42 exercises control over the entire game management server device 4. For example, in response to a request from a terminal device 1, the game management control module 42 refers to the game story storage module 60, executes a process that matches a game story, and transmits the results of request processing to the terminal device 1 in response.

In the present embodiment, a game that includes multiple independent battle scenes, each respectively featuring an enemy character that appears therein as an opponent of a player character, is provided to the player in a sequential manner by the game management control module 42, such that when the player clears one battle scene, the next battle scene is provided to the player. Specifically, the game management control module 42 provides the player with a game that includes multiple stages that respectively contain at least one battle scene. While the present embodiment has been discussed with reference to an example in which each stage contains only one respective battle scene, each stage can be adapted to contain two or more battle scenes.

The player information storage module 68 stores player information of various types for all the players participating in the game. While not illustrated, the player information storage module 68 may include fields such as "Player ID", "Icon Information", "Player Name", "Level", "Proprietary Items", and so forth. "Player ID" is information identifying (distinguishing) the players. "Icon Information" is information identifying the display icons of said players. "Player Name" is information relating to the display names of said players. "Level" indicates the level attained by said players in the course of the game. "Proprietary Items" is information indicating the item IDs of the items owned by said players.

The item information storage module 62 stores information related to equipment and other items belonging each of the player characters and enemy characters used in the game. For example, the item information storage module 62 may include fields such as "Item ID", "Icon Information", "Item Name", "Item Type", "Parameter Value", and so forth. "Item ID" is information identifying items. "Icon Information" is information identifying the display icons of said items. "Item Name" is information indicating the display names of said items. "Parameter Values" is information indicating various parameter values related to said items.

FIG. 5 is a diagram illustrating an exemplary partial internal configuration of the item information storage module 62 in accordance with the present embodiment. In the example illustrated herein, the items are player characters.

The item information storage module 62 stores parameter values such as "Defeat Parameter Value (HP)", "Attack Strength", "Blow Strength", and the like, in association with "Item IDs (Player Character IDs)". "Defeat Parameter Value (HP)" is a parameter value that is required to defeat said player character. "Attack Strength" is a parameter value that affects the attack value produced when said player character attacks an enemy character. "Blow Strength" is a parameter value that affects the break value produced when said player character attacks an enemy character.

FIG. 6 is a diagram illustrating another exemplary partial internal configuration of the item information storage module 62 in accordance with the present embodiment. In the example illustrated herein, the items are enemy characters.

The item information storage module 62 stores parameter values, such as "Defeat Parameter Value (HP)", "Break Parameter Value", "Attack Strength", "Blow Resistance", "Break Period (seconds)", and the like, in association with "Item IDs (Enemy Character IDs)". In the present embodiment, the item information storage module 62 operates as a break parameter value storage module that stores break parameter values.

"Defeat Parameter Value (HP)" is a defeat parameter value that is required to defeat said enemy character. "Attack Strength" is a parameter value that affects the attack value produced when said enemy character attacks a player character.

"Break Parameter Value" is information indicating the break parameter value required to place said enemy character into a break state. "Blow Resistance" is a parameter value that affects the break values produced as a result of the player character's attacks when said enemy character is attacked by a player character. In the present embodiment, an arrangement can be used in which break values are generated in response to a difference between the blow strength of the player character and the blow resistance of the enemy character. "Break Period (seconds)" is information indicating a predetermined break period when said enemy character is placed into a break state. The terms "break state" and "break values" will be described below.

It should be noted that, while the present embodiment uses an arrangement in which both attack strength and blow strength are respectively configured for the player characters, an arrangement is possible in which, for example, attack strength doubles as blow strength. In addition, while the present embodiment uses an arrangement in which both break parameter values and defeat parameter values are respectively configured for the enemy characters, an arrangement is possible in which, for example, defeat parameter values double as break parameter values.

It should be noted that the parameter values of the items can be adapted to increase or decrease as the player progresses through the game and, in such a case, the parameter values of the players' items can be adapted to be stored in association with the player IDs of the players.

Referring back to FIG. 4, the carryover condition determination module 80 determines whether or not an attack carried out by the player in a battle scene against an enemy character appearing in said battle scene satisfies a carryover condition. As used herein, the term "carryover condition" refers to a condition in which that attacks against said enemy character can be extended to other enemy characters configured to appear in battle scenes other than said battle scene.

With respect to the carryover condition, it can be assumed that, for example, the following two conditions are satisfied: (1) the break value (first break value) generated during the player character's attack against the enemy character in this battle scene is equal to the break parameter value required to place said enemy character into a predetermined break state configured in said enemy character; and (2) the player character's attacks against said enemy character during a predetermined break period when said enemy character is in a predetermined break state meet a predetermined overbreak condition.

With respect to the predetermined overbreak condition, it can be assumed, for example, that the break value (second break value) generated as a result of attacks by the player character against the enemy character during the predetermined break period when said enemy character is in the predetermined break state, is equal to the break parameter value configured in said enemy character.

If the carryover condition is satisfied, the carryover processing module 82 sequentially executes a process during which an attack value (first attack value) generated as a result of the player character's attacks against the enemy character in a first battle scene is used to offset defeat parameter values required to defeat enemy characters that are configured in each of said enemy characters appearing in each battle scene provided subsequent to said first battle scene. The carryover processing module 82 stores the results in the carryover information storage module 72 as carryover information.

Subsequently, when the current battle scene is cleared and the character moves on to the next battle scene, for example, the carryover processing module 82 uses the carryover information stored in the carryover information storage module 72 to skip the appearance of the enemy characters whose defeat parameter values have been reduced to zero and, additionally, causes the subsequently appearing enemy character to appear in a state in which the defeat parameter value of said enemy character has been offset.

Specifically, a process can be sequentially executed by the carryover processing module 82 whereby, for example, the excess value by which the attack value exceeds the defeat parameter value of said enemy character in said first battle scene is used to offset defeat parameter values that are configured in each of the enemy characters appearing in each battle scene provided subsequent to said first battle scene, until said excess value is reduced to zero. The carryover processing module 82 stores the results in the carryover information storage module 72 as carryover information. After that, the carryover processing module 82 uses the information stored in the carryover information storage module 72 to skip the appearance of the enemy characters whose defeat parameter values have been reduced to zero and causes the subsequently appearing enemy character to appear in a state in which the defeat parameter value of said enemy character has been offset by said excess value.

For example, in the present embodiment, the carryover processing module 82 can provide the enemy character that appears subsequent to skipping to the player's terminal device 1 by causing it to appear in the battle scene in which said enemy character is configured to appear. As an alternative example, however, an arrangement may also be used in which the next enemy character that appears subsequent to skipping is provided to the player's terminal device 1 by causing it to appear in the first battle scene.

For each battle scene, the stage information storage module 70 stores the ID information of the enemy character appearing in said battle scene, the carryover condition, the overbreak condition, information of various types related to said battle scene, and the like.

FIG. 7 is a diagram illustrating an exemplary internal configuration of the stage information storage module 70 in accordance with the present embodiment.

The stage information storage module 70 contains columns (fields) such as "Stage ID", "Battle Scene ID", "Enemy Character ID", "Carryover Condition", "Overbreak Condition", and the like.

"Stage ID" is information identifying stages. "Battle Scene ID" is information identifying battle scenes. "Enemy character ID" is information indicating the item ID of the enemy character appearing in said stage. "Carryover Condition" is information indicating a carryover condition. "Overbreak Condition" is information indicating an overbreak condition. In addition, the stage information storage module 70 can also store information of various types relating to each battle scene and each stage in association with "Battle Scene ID" and "Stage ID". Namely, in the present embodiment, the battle scenes "b001" to "b004" with the Stage IDs "s001" to "s004" are provided in that order, and the enemy character IDs "E001" to "E004" are configured to appear in that order.

Referring back to FIG. 4, the battle management module 54 manages battles between the player characters and the enemy characters under the control of the game management control module 42. Specifically, for example, whenever a player character carries out an attack against an enemy character, the battle management module 54 generates a predetermined attack value based, for example, on the attack strength of the player character, or generates a predetermined break value in response to the blow strength of the player character and the blow resistance of the enemy character.

In the present embodiment, the enemy character is defeated when, for example, the accumulated attack value generated as a result of the player character's attacks becomes equal to the defeat parameter value. The game management control module 42 can be adapted such that a battle scene is cleared once all the enemy characters configured to appear in said battle scene have been defeated. However, in other instances, the game management control module 42 can be adapted such that the battle scene is cleared when other predetermined conditions are satisfied.

In addition, when the accumulated break value generated as a result of the player character's attacks becomes equal to the break parameter value, the game management control module 42 places said enemy character into a break state for a configured predetermined break period. The game management control module 42 accepts attacks against said enemy character from the player character even during the predetermined break period when the enemy character is in a break state. The carryover condition determination module 80 determines whether or not the player character's attacks at such time satisfy a predetermined overbreak condition.

In addition, an enemy character can be adapted to have several body parts such as, for example, a head, a torso, hands, legs, and so on. In such a case, if an attack aimed at a predetermined body part succeeds and the body part is destroyed, the break value resultant from the player character's attack is increased, which makes it easier, for example, to induce a break state. The effectiveness of an attack on a given body part may be configured uniformly in all the enemy characters, or it may be configured for each enemy character. Such settings can be pre-stored, for example, in the item information storage module 62.

It should be noted that an arrangement can be used in which the predetermined break period, during which the enemy character is in a break state, is configured for each enemy character. In addition, if the enemy character is adapted to have a plurality of body parts, the predetermined break period can be extended if an attack aimed at a predetermined body part succeeds and the body part is destroyed. Such settings can be pre-stored, for example, in the item information storage module 62.

The presentation processing module 56 executes a process in which information of various types is transmitted to the terminal device 1 and presented on the terminal device 1 by the screen display processing module 18, or the like, of the terminal device 1 under the control of the game management control module 42. For example, game screens, including battle screens having multiple player characters and enemy characters displayed thereon, are displayed by the presentation processing module 56 on the terminal device 1.

Figure 8:
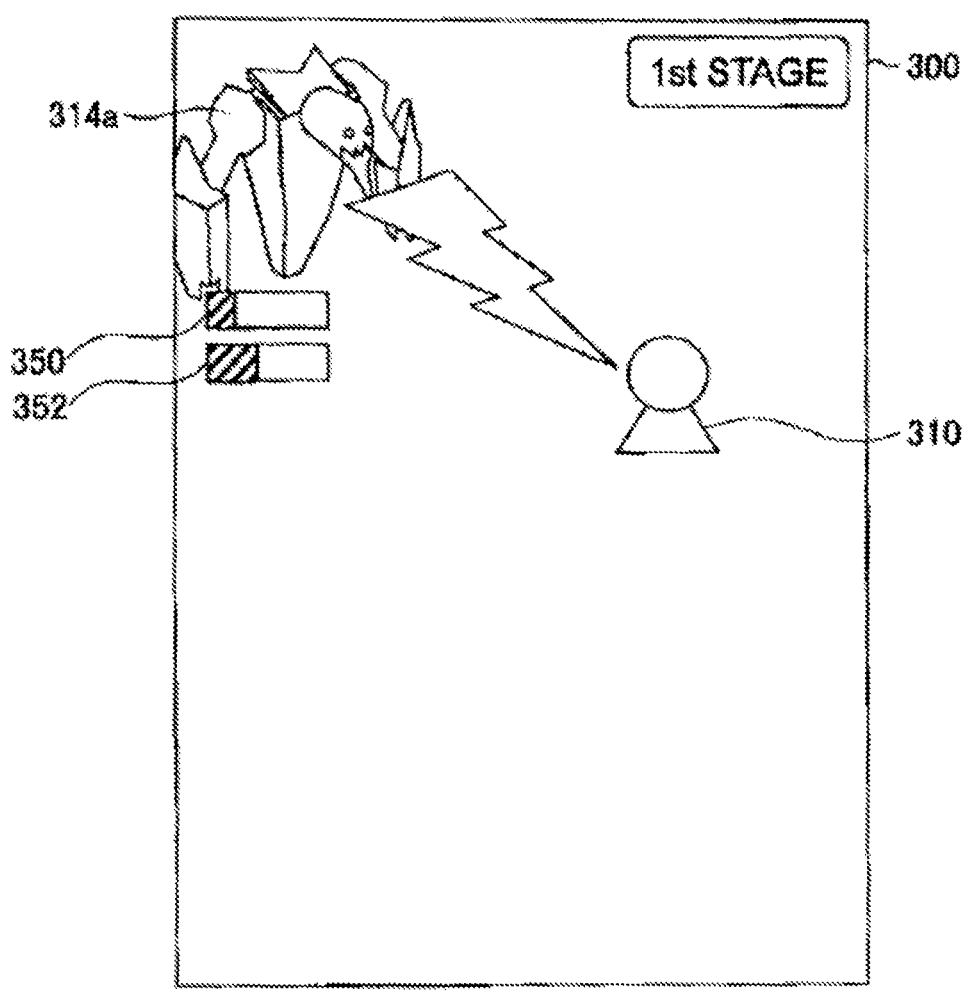
FIG. 8 A diagram illustrating an exemplary game screen in accordance with Embodiment 1.

FIG. 8 illustrates an exemplary game screen 300 provided by the game management control module 42 and displayed on the player's terminal device 1 by the screen display processing module 18. A player character 310 and an enemy character 314*a* are displayed on the game screen 300. In addition, an indicator 350 indicating the remaining value of the break parameter and an indicator 352 indicating the remaining value of the defeat parameter of the enemy character 314a are shown in the vicinity of the enemy character 314a. This game screen 300 is meant to represent Stage 1 (Battle Scene 1).

When the player carries out an attack against the enemy character 314a using the player character 310, the values of the break parameter value indicator 350 and the defeat parameter value indicator 352 are decreased by the attack value and break value generated as a result of this attack.

Figure 9:
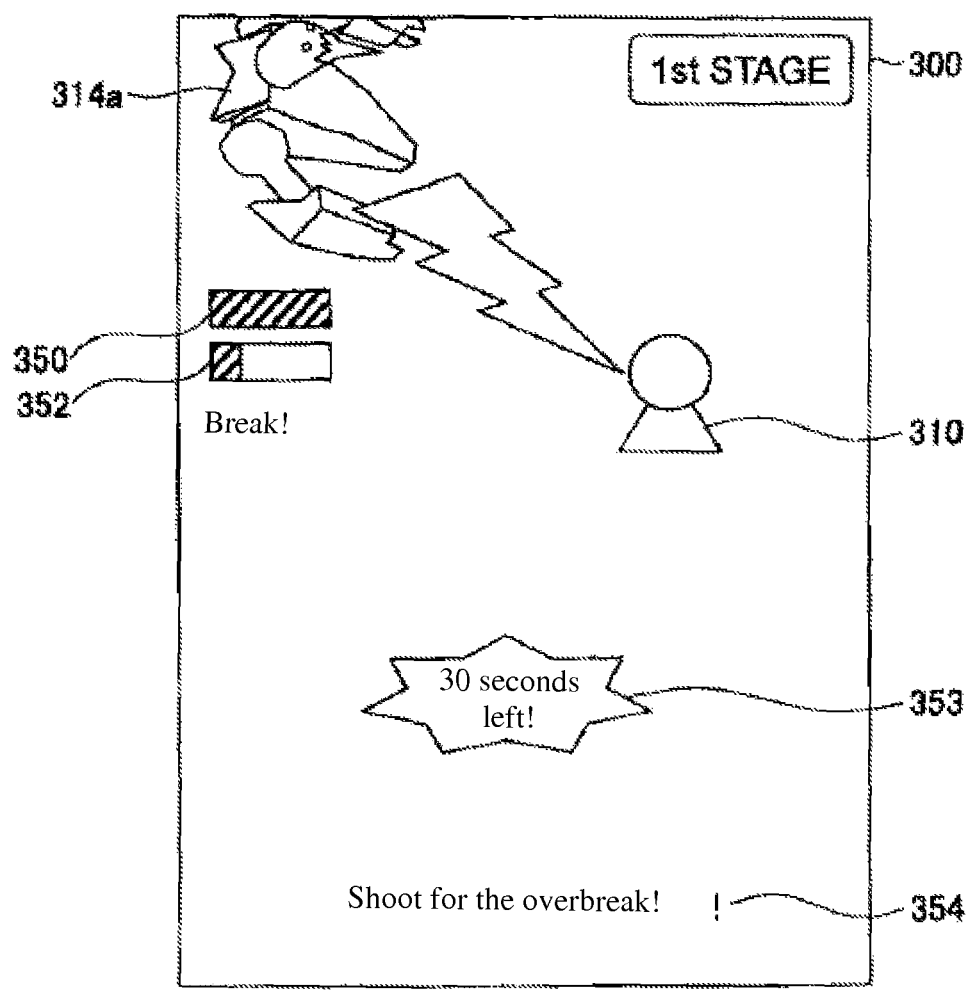
FIG. 9 A diagram illustrating an exemplary game screen in accordance with Embodiment 1.

When the value of the break parameter value indicator 350 is reduced to zero, the enemy character 314a is placed into a break state for a predetermined break period configured in the enemy character 314a. It should be noted that, in the present embodiment, the value of the indicator 350 can be adapted to be completely restored to match the full break parameter value if the remaining value of the break parameter value indicator 350 is reduced to zero and the enemy character 314a is placed into a break state. FIG. 9 illustrates this state. It should be noted that the defeat parameter value indicator 352 may be left unchanged at such time.

The game screen 300 shown in FIG. 9 illustrates a state in which the enemy character 314a is flying through the air unconscious. The game screen 300 displays information 353 indicating the remaining value of the break period, for example, "30 seconds left!", as well as messages 354, such as "Shoot for the overbreak!" and the like.

After that, when the player carries out an attack against the enemy character 314a using the player character 310 and the remaining value of the break parameter value indicator 350 is again reduced to zero, the carryover condition determination module 80 determines that the overbreak condition has been satisfied, in other words, that the carryover condition has been satisfied.

A process can be sequentially executed by the carryover processing module 82 whereby, for example, the excess value by which the accumulated attack value generated as a result of the attacks by the player character 310 in the first battle scene exceeds the defeat parameter value of the enemy character 314a is used to offset defeat parameter values configured in each of the enemy characters appearing in each battle scene provided subsequent to said first battle scene, until said excess value is reduced to zero.

Figure 10:
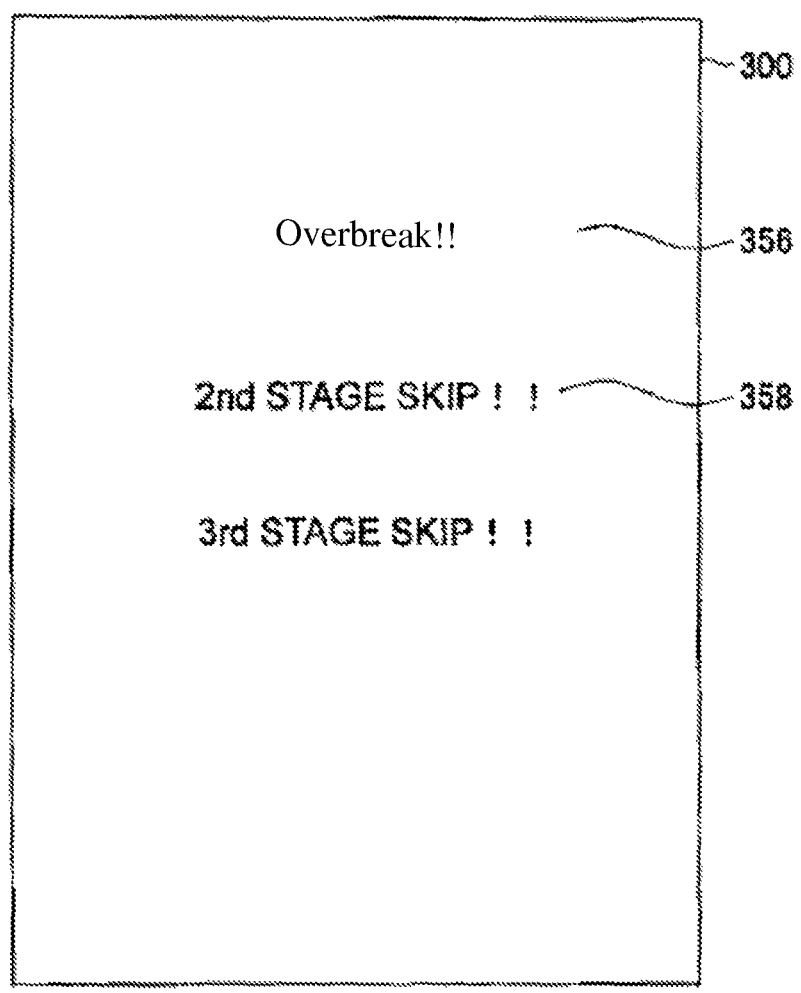
FIG. 10 A diagram illustrating an exemplary game screen in accordance with Embodiment 1.

Next, the carryover processing module 82 skips the appearance of the enemy characters whose defeat parameter values have been reduced to zero. Here, it is assumed that, for example, the excess value is used to reduce the defeat parameter values of the enemy character in Stage 2 (Battle Scene 2) and the enemy character in Stage 3 (Battle Scene 3) to zero and, furthermore, to reduce the defeat parameter value of the enemy character in Stage 4 (Battle Scene 4). FIG. 10 is the game screen 300 displayed at such time. At such time, the carryover processing module 82 skips the appearance of the enemy character in Stage 2 (Battle Scene 2) and the enemy character in Stage 3 (Battle Scene 3).

Figure 11:
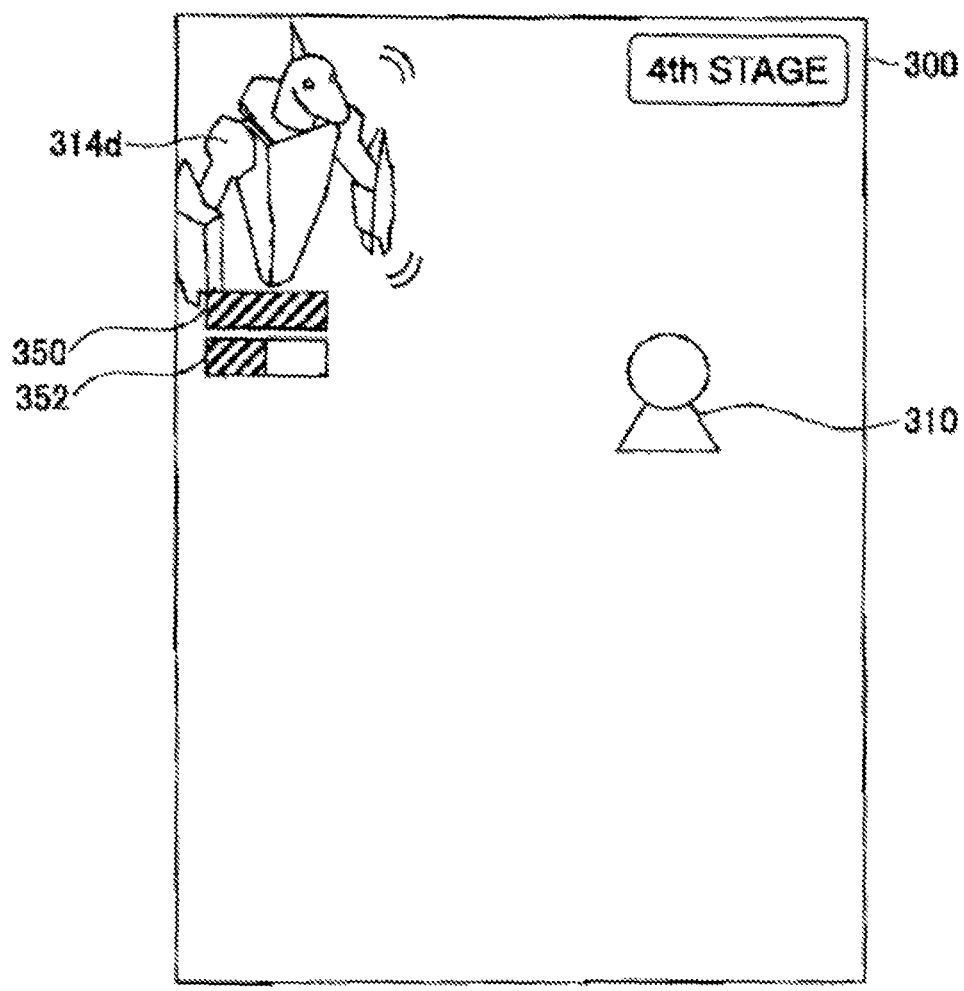
FIG. 11 A diagram illustrating an exemplary game screen in accordance with Embodiment 1.

After that, the carryover processing module 82 causes the subsequently appearing enemy character to appear in a state in which the defeat parameter value of said enemy character has been offset and reduced by the excess value. FIG. 11 is the game screen 300 displayed at such time. This game screen 300 is meant to represent Stage 4 (Battle Scene 4). Items illustrated here include the enemy character 314d of Stage 4 (Battle Scene 4), indicator 350, which indicates the remaining value of the break parameter, and indicator 352, which indicates the remaining value of the defeat parameter of the enemy character 314d. In addition, when the enemy character 314d appears, the value of the defeat parameter value indicator 352 is displayed to indicate a decreased defeat parameter value than that which is originally configured in the enemy character 314d. It should be noted that in this example the break parameter value indicator 350 can be adapted to be displayed with the break parameter value configured in the enemy character 314d set to 100%. As an alternative example, the remaining value of the break parameter value indicator 350 can be adapted to display a decreased value in the same manner as the defeat parameter value indicator 352.

Figure 12:
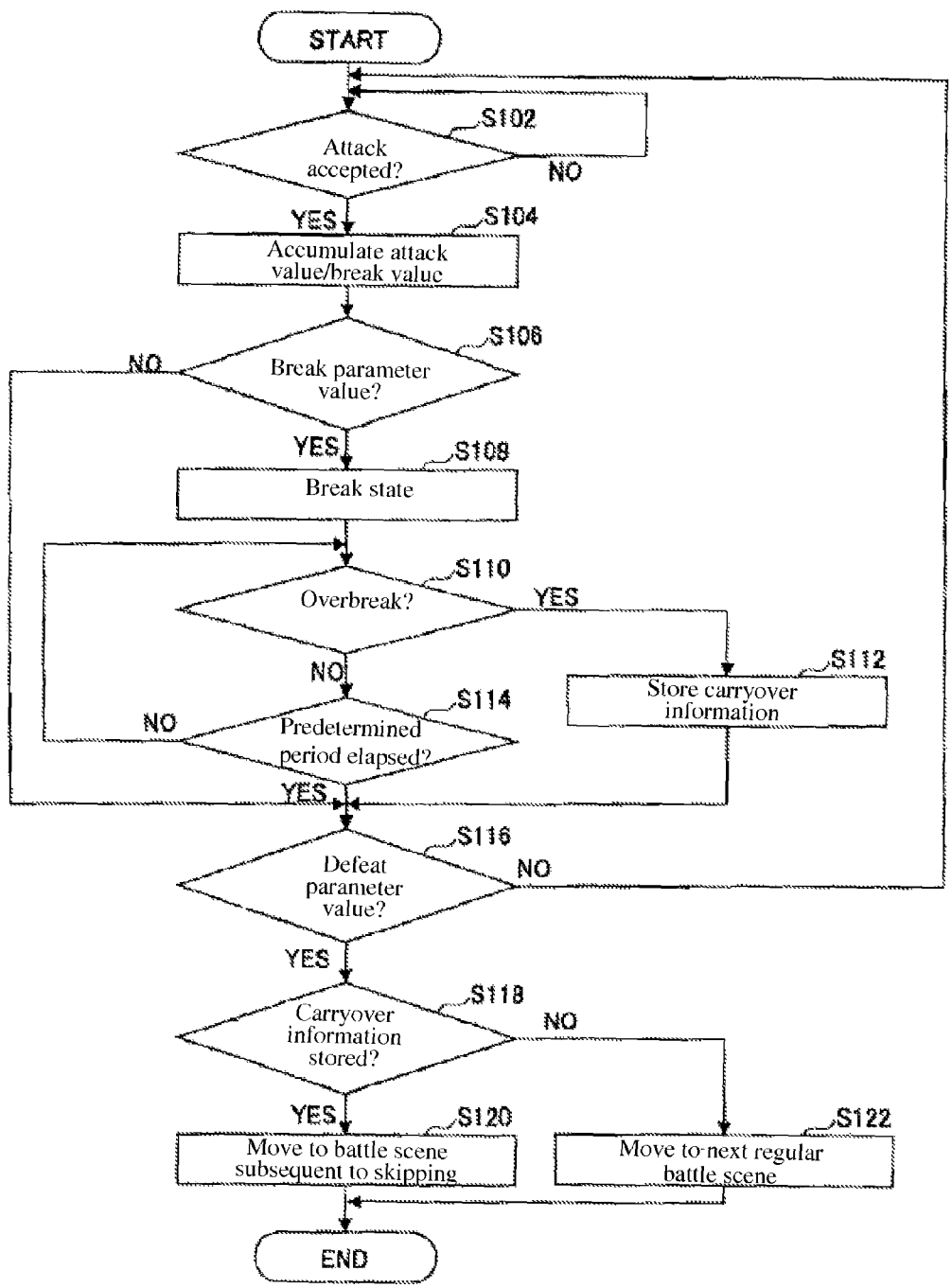
FIG. 12 A flow chart illustrating an exemplary processing procedure used by the game management server device in accordance with Embodiment 1.

FIG. 12 is a flow chart illustrating an exemplary processing procedure used by the game management server device 4 in accordance with the present embodiment. The following process can be executed under the control of the game management control module 42.

In the event of an attack by the player character against an enemy character in a certain battle scene (YES in Step S102), the battle management module 54 accumulates the attack and break values generated in response to the player character's attack (Step S104).

The carryover condition determination module 80 monitors whether or not the break value has reached the break parameter value (Step S106). If it has reached the break parameter value (YES in Step S106), the game management control module 42 places the enemy character into a break state (Step S108). While not illustrated, it should be noted that in the event of attacks by the player character against the enemy character after inducing the break state of Step S108, the battle management module 54 keeps accumulating the attack and break values generated in response to the player character's attacks.

While the enemy character is in the break state, the carryover condition determination module 80 monitors whether or not the overbreak condition has been satisfied (Step S110). If the overbreak condition has been satisfied (YES in Step S110), the carryover processing module 82 executes a process extending attacks against this enemy character to other enemy characters and stores the results in the carryover information storage module 72 as carryover information (Step S112).

After that, the game management control module 42 determines whether or not the accumulated attack value has reached the defeat parameter value (Step S114), and if it has reached the defeat parameter value (YES in Step S114), the game management control module 42 refers to the carryover information storage module 72 to determine whether or not carryover information has been stored (Step S118). If carryover information has been stored (YES in Step S118), the carryover processing module 82 moves on to the next battle scene with this carryover information reflected (Step S120). On the other hand, if no carryover information has been stored (NO in Step S118), the game management control module 42 moves on to the next battle scene in the usual manner (Step S122).

If the defeat parameter value is not reached in Step S116 (NO in Step S116), the procedure goes back to Step S102 while remaining in the same battle scene, and the game management control module 42 accepts the player character's attacks against the enemy character.

On the other hand, if the overbreak condition is not satisfied in Step S110 (NO in Step S110), the carryover condition determination module 80 determines whether or not the predetermined break period has elapsed (Step S114), and the procedure advances to Step S116 if the predetermined break period has elapsed (YES in Step S114).

If the predetermined break period has not elapsed in Step S114 (NO in Step S114), the procedure goes back to Step S110 and the same process is repeated.

In addition, if the break parameter value is not reached in Step S104 (NO in Step S106), the procedure advances to Step S116.

It should be noted that if a termination instruction from the player arrives at any point, the game management control module 42 terminates the process. In addition, while not illustrated, the game management control module 42 terminates the process if a predetermined "game over" condition is satisfied.

The process executed by the carryover processing module 82 will be described with reference to the arrangement of FIG. 7, which illustrates the settings of the stage information storage module 70, and the arrangement of FIG. 6, which illustrates the enemy character-related settings of the item information storage module 62. Here, the attack value generated during the player character's attack against the enemy character in the battle scene with an ID of "b001", in which an enemy character with an enemy character ID of "E001" appears, is assumed to be 2000.

At this point, since the defeat parameter value of the enemy character with the enemy character ID of "E001" is 400, first, the excess value of the attack value (the value by which this defeat parameter value is exceeded) becomes 1600. Next, the carryover processing module 82 uses the excess value (1600) to offset the defeat parameter value (300) of the enemy character with the next enemy character ID of "E002", after which the excess value of the attack value is set 1300. Next, the carryover processing module 82 uses the excess value (1300) to offset the defeat parameter value (1000) of the enemy character with the next enemy character ID of "E003", after which the excess value of the attack value is set to 300. Next, the carryover processing module 82 uses the excess value (300) to offset the defeat parameter value (5000) of the enemy character with the next enemy character ID of "E004". As a result of the above-described process, after skipping the enemy characters with the enemy character ID of "E002" and the enemy character ID of "E003", the carryover processing module 82 causes the enemy character with the enemy character ID of "E004" to appear with its defeat parameter value 5000 summed with the 300-point attack value.

It should be noted that while the process above was illustrated using an example in which the procedure moves on (Step S120) to the battle scene subsequent to skipping after the attack value has reached the defeat parameter value in Step S116 even if the overbreak condition is satisfied in Step S110, as an alternative example, once the overbreak condition has been satisfied, the procedure may immediately move on to the battle scene subsequent to skipping regardless of whether or not the attack value has reached the defeat parameter value.

As described above, a technology can be provided that saves the player's time and effort in the battle scenes of games that include multiple independent battle scenes, each respectively featuring an enemy character that appears therein as an opponent of a player character. In addition, a technology can be provided that enables the player to clear battle scenes in a speedy manner and enjoy the game even more.

Embodiment 2

This embodiment will be described with reference to the terminal device 1 as the game-providing device. In the present embodiment, since the system configuration, the hardware configuration of the terminal device 1, and the hardware configuration of the game management server device 4 are the same as those described with reference to FIGS. 1 to 3 in Embodiment 1, they will not be illustrated or described.

Figure 13:
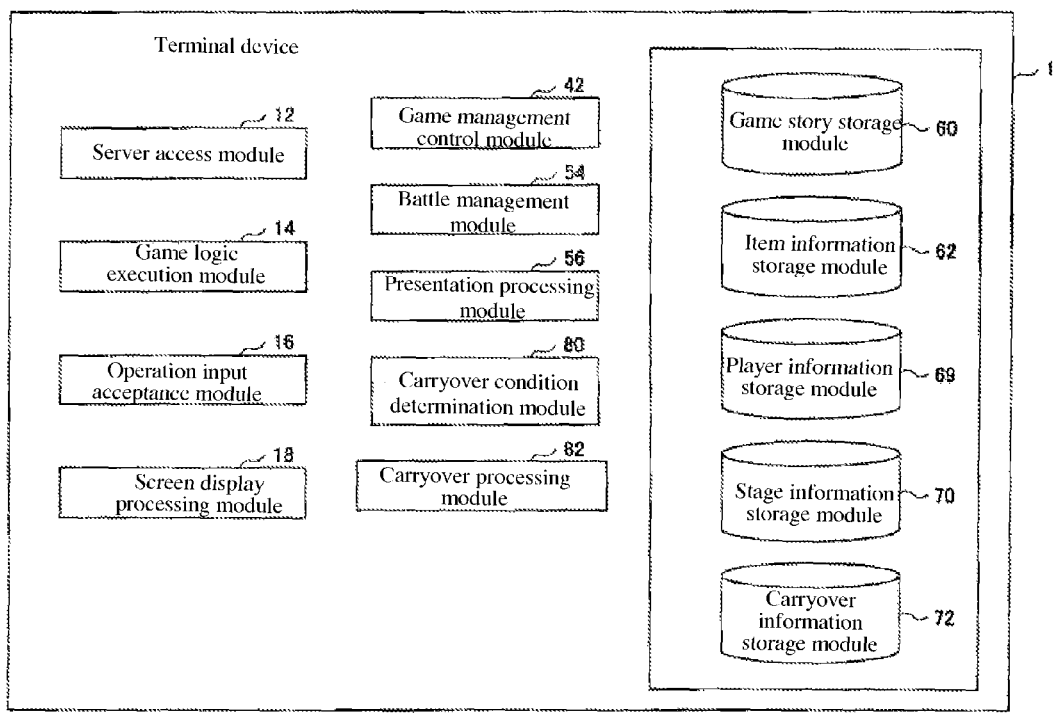
FIG. 13 A block diagram illustrating an exemplary functional configuration of the terminal device in accordance with Embodiment 2.

FIG. 13 is a block diagram illustrating the functional configuration of the terminal device 1 in accordance with the present embodiment. In the present embodiment, an arrangement can be used in which a piece of game application software (application program, such as non-transitory computer-readable medium containing instructions stored in a storage and executable on a hardware device).) is downloaded from the game management server device 4 to the terminal device 1 in advance, the game application software is run on the terminal device 1, and processing is performed based on the information contained in the game application software that has been stored in the terminal device 1 via download. However, information can be adapted to be sent and accepted on demand by accessing the game management server device 4 on an as-needed basis. While not illustrated, in the present embodiment, the game management server device 4 can be adapted to include some of the constituent elements depicted in FIG. 4, such as the player information storage module 68, and the like.

In the present embodiment, in addition to the server access module 12, game logic execution module 14, operational input acceptance module 16, and screen display processing module 18 illustrated in FIG. 4, the terminal device 1 includes a game management control module 42, a battle management module 54, a presentation processing module 56, a carryover condition determination module 80, a carryover processing module 82, a game story storage module 60, an item information storage module 62, a player information storage module 69, a stage information storage module 70, and a carryover information storage module 72. It should be noted that the basic functions of each constituent element are the same as those discussed in Embodiment 1, and description thereof will be omitted as appropriate.

While the player information storage module 69 can be adapted to contain the same information as the player information storage module 68 described with reference to FIG. 4, it can also be adapted to store information relating only to the player using said terminal device 1. In addition, in the present embodiment, the game management server device 4 can be adapted to include the player information storage module 68 in order to manage all the players participating in the game.

In addition, in the present embodiment, an arrangement can be used in which the game story storage module 60, the item information storage module 62, the stage information storage module 70, the carryover information storage module 72, and the like are included not in the terminal device 1, but in the game management server device 4, in the same manner as explained in Embodiment 1. In such a case, the terminal device 1 can be adapted to acquire necessary information by accessing the game management server device 4 on an as-needed basis.

Embodiment 3

The present embodiment, in the same manner as Embodiment 1, will be described with reference to the game management server device 4 as the game-providing device. In the present embodiment, since the system configuration, the hardware configuration of the terminal device 1, and the hardware configuration of the game management server device 4 are also the same as those described with reference to FIGS. 1 to 3 in Embodiment 1, they will not be illustrated or described.

Figure 14:
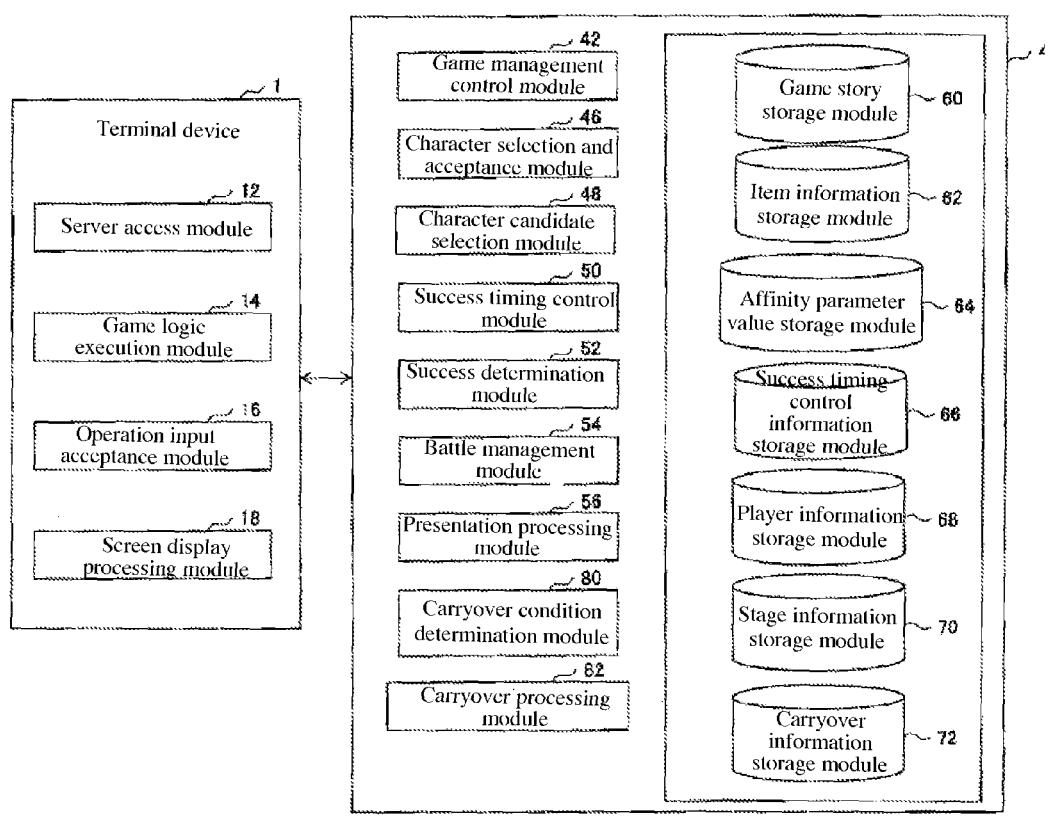
FIG. 14 A block diagram illustrating an exemplary functional configuration of the terminal device and game management server device in accordance with Embodiment 3.

FIG. 14 is a block diagram illustrating the functional configuration of the terminal device 1 and game management server device 4 in accordance with the present embodiment.

In addition to the configuration of the game management server device 4 according to Embodiment 1 illustrated in FIG. 4, the game management server device 4 includes a character selection and acceptance module 46, a character candidate selection module 48, a success timing control module 50, a success determination module 52, an affinity parameter value storage module 64, and a success timing control information storage module 66.

In the present embodiment, the game management control module 42 provides a game in which each player uses a team of multiple player characters to engage in battle with an enemy character. The game provided by the game management server device 4 of the present embodiment can employ an arrangement such as the one described below.

The multiple player characters of each player attack an enemy character in a sequential manner. Specifically, each player first selects a first player character serving as the initiator of an attack against the enemy character from a team of their own multiple player characters and attacks the enemy character using said first player character. In the present embodiment, special abilities associated with the first player character are activated at such time. Recovering the hit point values of the player characters, varying the parameter values of said player characters, varying the parameter values of the enemy characters, and the like are suggested as the special abilities associated with the player characters. It is important for the player to assess the game situation and select an appropriate player character as the first player character from his/her own team of multiple player characters. After that, a second player character, which attacks the enemy character after the first player character's attack, is selected by the player or by the game management server device 4 based on predetermined conditions.

Subsequently, the player uses tapping or other gestures on the player's own terminal device 1 to exercise control over the timing of the second player character's attack against the enemy character. Specifically, the game management server device 4 determines timing of the second player character's attack against the enemy character as the moment when the player operates (by tapping, etc.) the terminal device 1. Here, if the timing of the second player character's attack against the enemy character is a predetermined successful consecutive attack timing controlled by the game management server device 4, advantageous conditions are provided to said player (i.e., if said second player character's attack against the enemy character is controlled as a successful consecutive attack such that, for example, the damage to the enemy character is increased, etc.).

Although the predetermined successful consecutive attack timing can be controlled in response to the timing of the first player character's attack against the enemy character, it can also be adapted to be controlled without regard to the timing of the first player character's attack against the enemy character.

As an example, if the predetermined successful consecutive attack timing is controlled in response to the timing of the first player character's attack against the enemy character, control can be exercised as follows. A successful consecutive attack can be assumed to take place if, in response to an immediately preceding attack by the first player character, the tension value of the second player character that carries out the subsequent attack is increased and the player issues an attack instruction to the second player character by operating (tapping, etc.) the terminal device 1 at the moment when the second player character's tension value is within a predetermined range. In other words, in this case, the predetermined successful consecutive attack timing is such that the second player character's tension value can be assumed to be within a predetermined range.

Even if the predetermined successful consecutive attack timing is controlled without regard to the timing of the first player character's attack against the enemy character, the second player character's tension value and other tension values can be adapted to undergo variation by, for example, increasing and decreasing them, and a successful consecutive attack can be assumed to take place if the player issues an attack instruction to the second player character by operating (tapping, etc.) the terminal device 1 at the moment when a parameter value of the second player character is within a predetermined range.

It should be noted that the timing of the first player character's attack against the enemy character may be specified by the player by operating the player's terminal device 1 or the first player character may, for example, attack the enemy character automatically at the moment when the first player character is selected. In any case, in the present embodiment, the timing of the second player character's attack against the enemy character can be made different from the timing of the first player character's attack against the enemy character.

Furthermore, an arrangement can be used in which, after the second player character's attack, a third player character that carries out an attack against the enemy character is selected by the player or by the game management server device 4 based on predetermined conditions, and if the timing of the third player character's attack against the enemy character is a predetermined successful consecutive attack timing, advantageous conditions are provided to said player (i.e., if said third player character's attack against the enemy character is controlled as a successful consecutive attack such that, for example, the damage to the enemy character is further increased, etc.). It should be noted that the third player character can be adapted to be selected simultaneously with the second player character, or it can be adapted to be selected after the second player character's attack.

For each one of the multiple player characters, the affinity parameter value storage module 64 stores affinity parameter values indicating the degree of affinity, such as the strength of association, between said player character and other player characters. The affinity parameter values can be parameter values indicating, for example, the level of friendship between each player character and other player characters.

FIG. 15 is a diagram illustrating an exemplary internal configuration of the affinity parameter value storage module 64 in accordance with the present embodiment. Here, for example, each one of the multiple player characters 310a to 310d has configured therefor affinity parameter values that indicate its affinity for other player characters. The affinity parameter values of two player characters may be non-symmetrical with respect to each other. For example, in the example illustrated in FIG. 15, the affinity parameter value of the player character 310a for the player character 310b is "10", while the affinity parameter value of the player character 310b for the player character 310a is "1". However, in other cases, the affinity parameter values of two player characters may be symmetrical.

In addition, although the settings of the affinity parameter value storage module 64 can be configured uniformly for all the players in the game management server device 4, it is also possible to use an arrangement in which they are configured for each individual player. In other words, the affinity parameter value storage module 64 can respectively store settings such as those illustrated in FIG. 15 in association with the player ID of each player.

In addition, if the settings of the affinity parameter value storage module 64 are configured for each individual player, then, for example, the affinity parameter values of two player characters can be adapted to increase if these two player characters have engaged in battle with enemy characters as a single team in past game play.

In addition, the affinity parameter value of each player character for other player characters can, for example, be increased in accordance with the degree of compatibility of the equipment items that each player character is equipped with.

Referring back to FIG. 14, the presentation processing module 56 executes a process in which the affinity parameter values between the multiple player characters, such as those illustrated in FIG. 15, are transmitted to the terminal device 1 and presented on the terminal device 1 by the screen display processing module 18, or the like, of the terminal device 1. Accordingly, the player can ascertain which player character's affinity parameter value for which player character is the highest and can select a player character advantageous in terms of game progress in the battle scene.

From a player's terminal device 1, the character selection and acceptance module 46 accepts a selection of a first player character from the multiple player characters that will be the first to attack the enemy character. In addition, from said player's terminal device 1, the character selection and acceptance module 46 accepts a selection of a second player character that will attack the enemy character after the first player character's attack. An arrangement can be used in which a player character is selected when, for example, the player taps the corresponding player character on the game screen displayed on the terminal device 1.

Once the first player character has been selected, the character candidate selection module 48 refers to the affinity parameter value storage module 64, chooses another player character as the second player character candidate based on the affinity parameter value for the selected first player character, and transmits it to the player's terminal device 1. Specifically, the character candidate selection module 48 refers to the affinity parameter value storage module 64, chooses another player character as the second player character candidate in the order of increasing affinity parameter values for the selected first player character, and transmits it to the player's terminal device 1.

Although the player can select the second player character candidate transmitted by the character candidate selection module 48 and displayed on the terminal device 1 as the second player character "as is", it is also possible for the player to arbitrarily select a different player character as the second player character. In addition, as described above, in other instances the character candidate selection module 48 can be adapted to select the second player character automatically instead of allowing the player to select the second player character.

The success timing control module 50 uses the second player character's affinity parameter value for the first player character to control the successful consecutive attack timing, which is the interval during which the second player character's attack against the enemy character following the first player character's attack results in a successful consecutive attack.

Specifically, a predetermined tension value range, within which the second player character's tension value gradually increases over time after a predetermined start timing, can be used by the success timing control module 50 as the successful consecutive attack timing, and control can be exercised such that the higher the second player character's affinity parameter value for the first player character, the wider the predetermined range. The wider the predetermined range, the easier it is for the player to enter the second player character's attack timing in accordance with the timing determined to be a successful consecutive attack timing and, therefore, the easier it is for consecutive attacks to succeed. It should be noted that the tension value does not only increase, and, for example, can be adapted to increase and decrease in a fluctuating manner, such that once it had reached a maximum value, it starts to decrease and, upon reaching a preset value, it starts to increase again, and so on.

For example, assuming that the tension value gradually increases from zero and the optimal timing for the second player character's attack against the enemy character to be carried out is when the tension value is at 100%, the player's operations may be evaluated in a stepwise manner (with 4 levels used here), such that the timing of the second player character's attack against the enemy character is considered as "very good" when the tension value is at least 95% but not more than 105%, as "good" when the tension value is at least 75% but less than 95%, as "fine" when the tension value is at least 50% but less than 75%, and as "bad" when the tension value is 0% or more but less than 50% or greater than 105%, and successful consecutive attacks may be assumed to take place when the evaluation is "good" or better.

Specifically, the success timing control module 50 can use a predetermined tension value range, within which the second player character's tension value gradually increases over time after a predetermined start timing, to produce successful consecutive attack timing, and can exercise control such that the tension value increases at a slower rate as the second player character's affinity parameter value for the first player character grows. The slower the rate at which the tension value increases, the easier it is for the player to enter the second player character's attack timing in accordance with the timing determined to be a successful consecutive attack timing and, therefore, the easier it is for consecutive attacks to succeed.

It should be noted that the predetermined start timing can be used as the timing of the first player character's attack against the enemy character.

The success timing control information storage module 66 stores success timing control information used by the success timing control module 50 for control purposes.

FIG. 16 is a diagram illustrating an exemplary internal configuration of the success timing control information storage module 66 in accordance with the present embodiment.

The success timing control information storage module 66 can include fields such as "Condition (Affinity Parameter Value)", "Success Timing Control Information", and the like. "Affinity Parameter Value" indicates the affinity parameter value of the second player character for the first player character and corresponds to "Affinity Parameter Value" illustrated in FIG. 15. "Success Timing Control Information" includes "Range (%)", "Speed", and the like.

"Range (%)" is information indicating the above-described predetermined tension value range within which successful consecutive attack timing is achieved. For example, if the affinity parameter value is "10", the range (%) is configured as "70 or more to 100 or less" (%). This shows that the interval from 70% or more to 100% or less produces successful consecutive attack timing as the second player character's tension value gradually increases over time. If the second player character's attack against the enemy character is carried out during this interval, it is determined to be a successful consecutive attack.

"Speed" is information indicating the rate of increase in the above-described tension value that produces the successful consecutive attack timing. For example, if the affinity parameter value is "10", "Speed" is configured as "normal". This indicates that over time the second player character's tension value gradually increases at a "normal" speed.

In the example illustrated in FIG. 16, "Speed" is uniformly set to "normal" without regard to the affinity parameter value. However, as shown in FIG. 17, the "Speed" of the "Success Timing Control Information" can be configured such that the tension value increases at a slower rate as the second player character's affinity parameter value for the first player character grows.

It should be noted that while "Range (%)" is uniformly set to "70 or more to 100 or less" (%) without regard to the affinity parameter value in the example illustrated in FIG. 17, combining the example illustrated in FIG. 16 with the example illustrated in FIG. 17 produces an arrangement in which the predetermined range becomes wider and the tension value increases at a slower rate as the second player character's affinity parameter value for the first player character grows.

Furthermore, as shown in FIG. 27 for example, the success timing control information storage module 66 can be configured such that the success timing control information varies not only in response to the affinity parameter value as a condition, but also, for example, in response to the second player character's attack strength, attributes configured in the player character, weapons the player character is equipped with, and the like. In the same manner as in the example illustrated in FIG. 16, the "Range (%)" of the success timing control information in the example illustrated in FIG. 27 is configured to grow wider as the second player character's affinity parameter value for the first player character increases. On the other hand, "Speed" is configured to slow down as the second player character's attack strength increases.

It should be noted that, as a variation of the example illustrated in FIG. 27, in the same manner as in the example illustrated in FIG. 17, the "Speed" of the success timing control information can be configured to slow down as the second player character's affinity parameter value for the first player character increases, and the "Range (%)" can be configured to grow wider as the second player character's attack strength increases.

Using such an arrangement, the success timing control module 50 can control the successful consecutive attack timing based on the second player character's affinity parameter value for the first player character and, at the same time, can exercise control by taking other parameter values into account. These other parameter values may include the second player character's attack strength and other second player character-related parameter values, as well as the difference in strength between the enemy character and the second player character, first player character-related parameter values, and so on.

Referring back to FIG. 14, when the player carries out the second player character's attack against the enemy character by operating the terminal device 1, the presentation processing module 56 can transmit guidance information used to present the successful consecutive attack timing on the terminal device 1. The guidance information can be information presented so as to enable visual confirmation of whether or not the above-described tension value is within a predetermined range, for example, it could be an indicator including information on the increase in, and the predetermined range of, the tension value.

In such a case, if the player performs an operation on the terminal device 1 to indicate the timing of the second player character's attack in accordance with the successful consecutive attack timing (within the predetermined range) presented based on the guidance information on said player's terminal device 1, the success determination module 52 can determine that said attack timing is a successful consecutive attack timing.

The success determination module 52 accepts the player's operation performed on the terminal device 1 as the timing of the second player character's attack against the enemy character and determines whether or not said accepted attack timing is a successful consecutive attack timing.

If the attack timing is a successful consecutive attack timing, the battle management module 54 exercises control such that advantageous conditions are provided to said player. As an example, the battle management module 54 makes the damage inflicted on the enemy character if the attack timing is a successful consecutive attack timing larger than the damage inflicted if the attack timing is not a successful consecutive attack timing. Configuration information regarding the extent of the damage in each case can be stored, for example, in the game story storage module 60 and in the item information storage module 62.

In addition, for example, the battle management module 54 can exercise control as follows.

For example, if the timing of the second player character's attack against the enemy character is a successful consecutive attack timing, the subsequent third player character is handled in the same manner as the second player character by allowing the player to control the timing of the third player character's attack against the enemy character using operations (tapping, etc.) performed on the player's own terminal device 1. In such a case, if the timing of the third player character's attack against the enemy character is a successful consecutive attack timing, the damage inflicted on the enemy character can be further increased. In addition, if the timing of the immediately preceding attack by the player character against the enemy character is a successful consecutive attack timing, a consecutive attack can be carried out immediately. The damage can be adapted to increase depending on the number of times consecutive attacks have been successful. In addition, predetermined skills configured in the player characters making up a single team can be adapted to be activated if consecutive attacks have been successful a predetermined number of times.

On the other hand, if the timing of the second player character's attack against the enemy character is not a successful consecutive attack timing, for example, it can be assumed that the consecutive attack has failed and the subsequent player characters can be directed to reject the player's operational input. In such a case, player characters can be directed to carry out only ordinary attacks in the order selected by the game management server device 4.

In addition, as an alternative example of the advantageous conditions provided to said player if the attack timing is a successful consecutive attack timing, it is possible, for instance, to activate a player character's skill or count the number of successful consecutive attacks and award a bonus to said player once a predetermined value has been reached.

Figure 26:
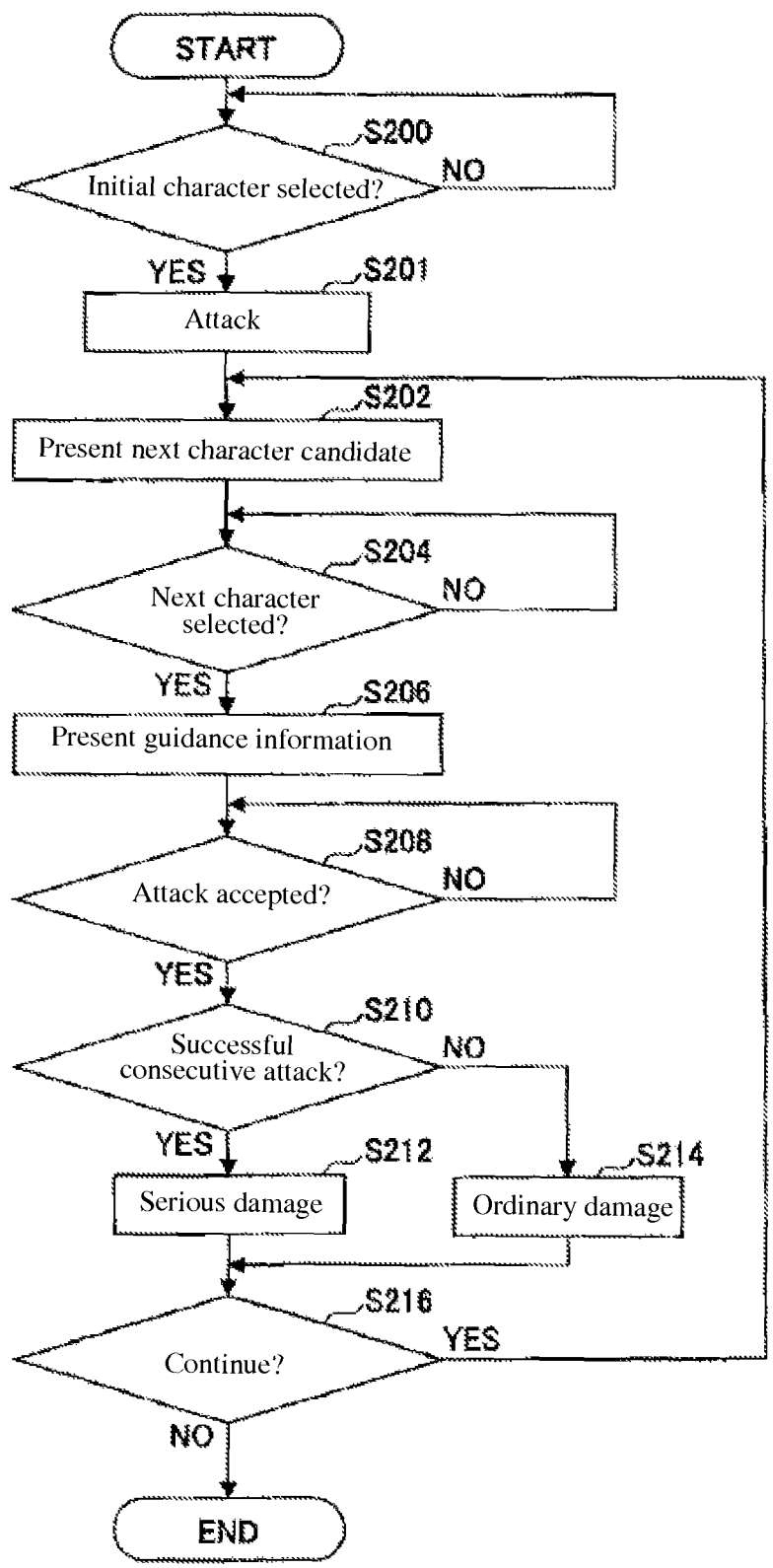
FIG. 26 A flow chart illustrating an exemplary processing procedure used by the game management server device in accordance with Embodiment 3.

FIG. 26 is a flow chart illustrating an exemplary processing procedure used by the game management server device 4 in accordance with the present embodiment. The following process can be executed under the control of the game management control module 42. The discussion below proceeds with reference to FIGS. 18 to 24, which illustrate specific examples of the game screens provided by the game management server device 4 and displayed on the terminal device 1.

Figure 18:
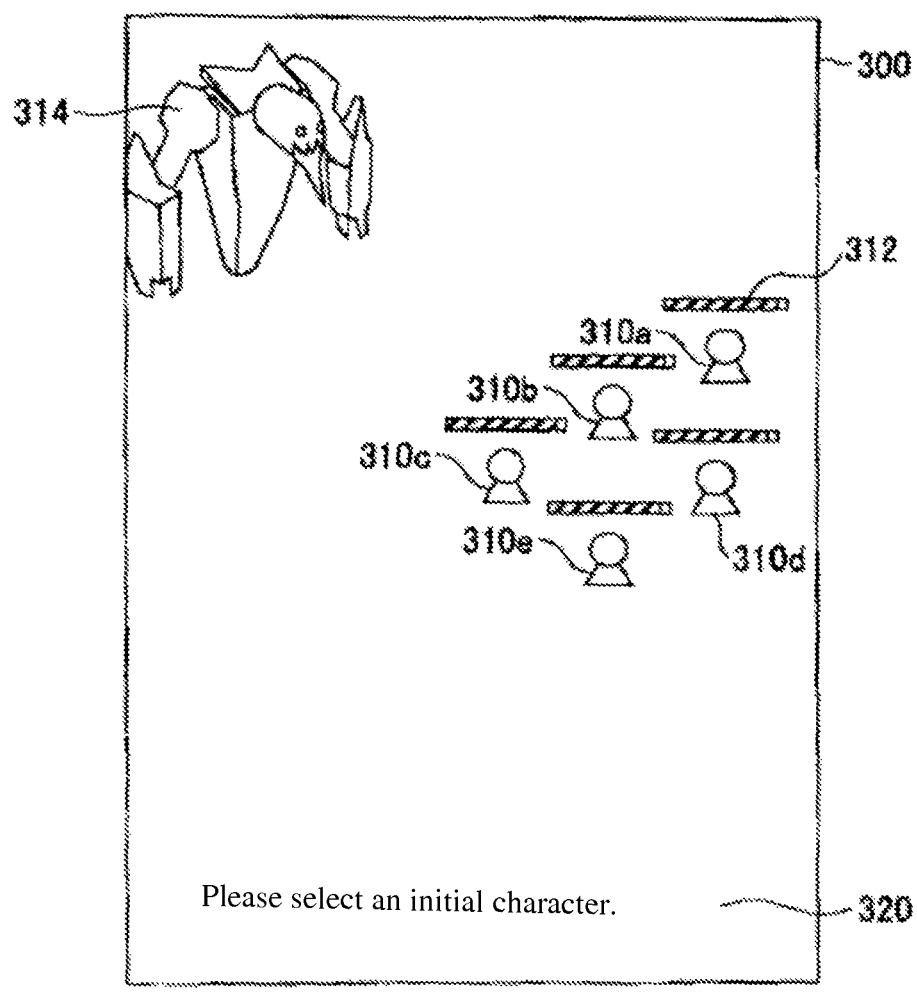
FIG. 18 A diagram illustrating an exemplary game screen in accordance with Embodiment 3.

FIG. 18 illustrates an exemplary game screen 300 provided by the game management control module 42 and displayed on the player's terminal device 1 by the screen display processing module 18. The game screen 300 displays a battle screen comprising a team of multiple player characters 310a-310e and an enemy character 314. In addition, indicators 312 indicating various parameter values relating to the player characters 310a-310e can also be located adjacent said player characters 310a-310e.

In the present embodiment, for example, all the five player characters 310a-310e displayed on the game screen 300 can be adapted to carry out attacks against the enemy character 314 in a sequential manner. However, as an alternative example, an arrangement can also be used in which attacks against the enemy character 314 are carried out using only some of the player characters, for example, three characters selected from the five player characters 310a-310e. In addition, the player or, based on predetermined conditions, the game management server device 4 can choose the player characters 310a-310e from the player characters belonging to said player.

In any of these scenarios, the player first selects an initial first player character. A message 320 urging the player to select a first player character, such as "Please select an initial character", is displayed on the game screen 300.

When the player selects (by tapping, etc.) the first player character (initial character) from any of the player characters 310a-310e (YES in Step S200 in FIG. 26), the first player character attacks the enemy character 314 (Step S201). The special abilities associated with the first player character may be adapted to be activated at such time. The timing of the first player character's attack against the enemy character 314 may be specified through the player's operations on the player's terminal device 1 and, in addition, the first player character may, for example, attack the enemy character automatically at the moment when the first player character is selected.

It should be noted that when the player selects the first player character, the character candidate selection module 48 refers to the affinity parameter value storage module 64, chooses a second player character candidate by selecting another player character with a high affinity parameter value for the first player character, whose selection has been accepted by the character selection and acceptance module 46, and presents it on the player's terminal device 1 (Step S202). As an alternative example, when the player selects the first player character, the character candidate selection module 48 can refer to the affinity parameter value storage module 64 and automatically select a second player character by choosing another player character with a high affinity parameter value for the first player character, whose selection has been accepted by the character selection and acceptance module 46.

Figure 19:
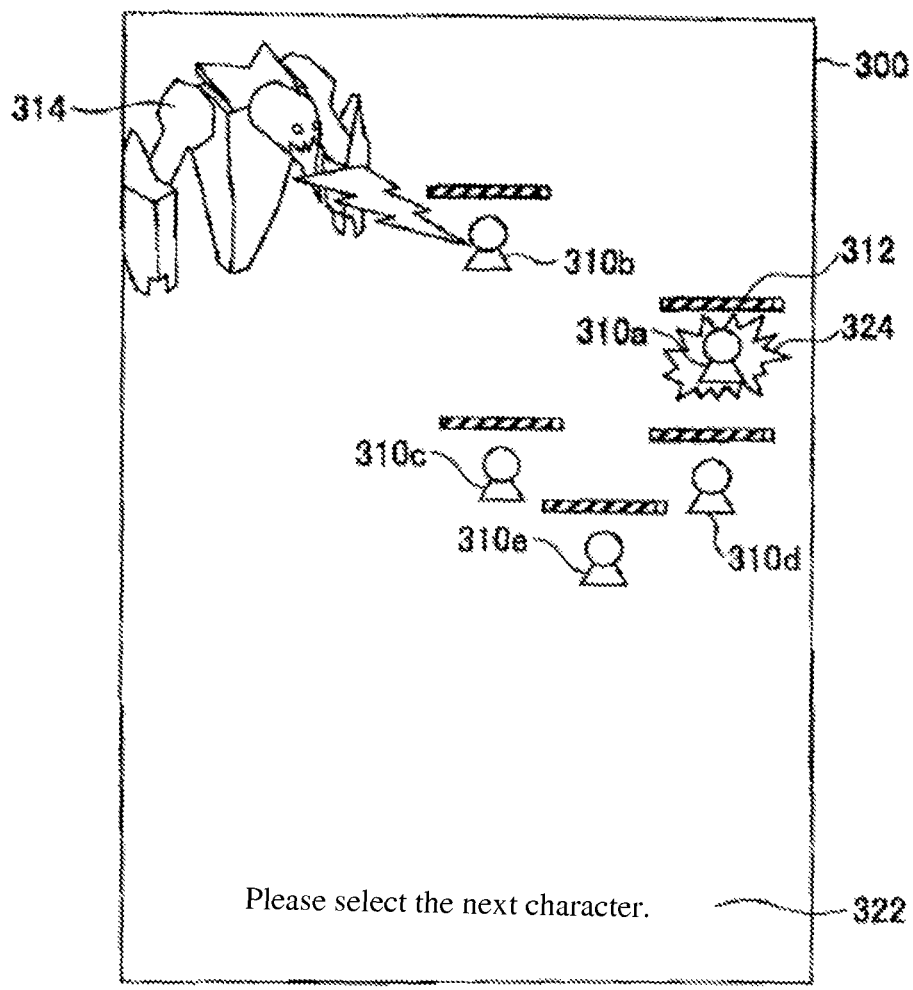
FIG. 19 A diagram illustrating an exemplary game screen in accordance with Embodiment 3.

FIG. 19 illustrates a game screen 300 that shows a state in which the player character 310b has been selected as the first player character and is attacking the enemy character 314. At such time, the player character 310a is selected as the second player character candidate and displayed with highlighting 324. In addition, a message 322 urging the player to select a second player character, such as "Please select the next character", is displayed on the game screen 300.

Referring back to FIG. 26, when the player selects (by tapping, etc.) the player character 310a, for example, as the second player character (YES in Step S204), the presentation processing module 56 presents guidance information indicating the successful consecutive attack timing on the player's terminal device 1 (Step S206).

Figure 20:
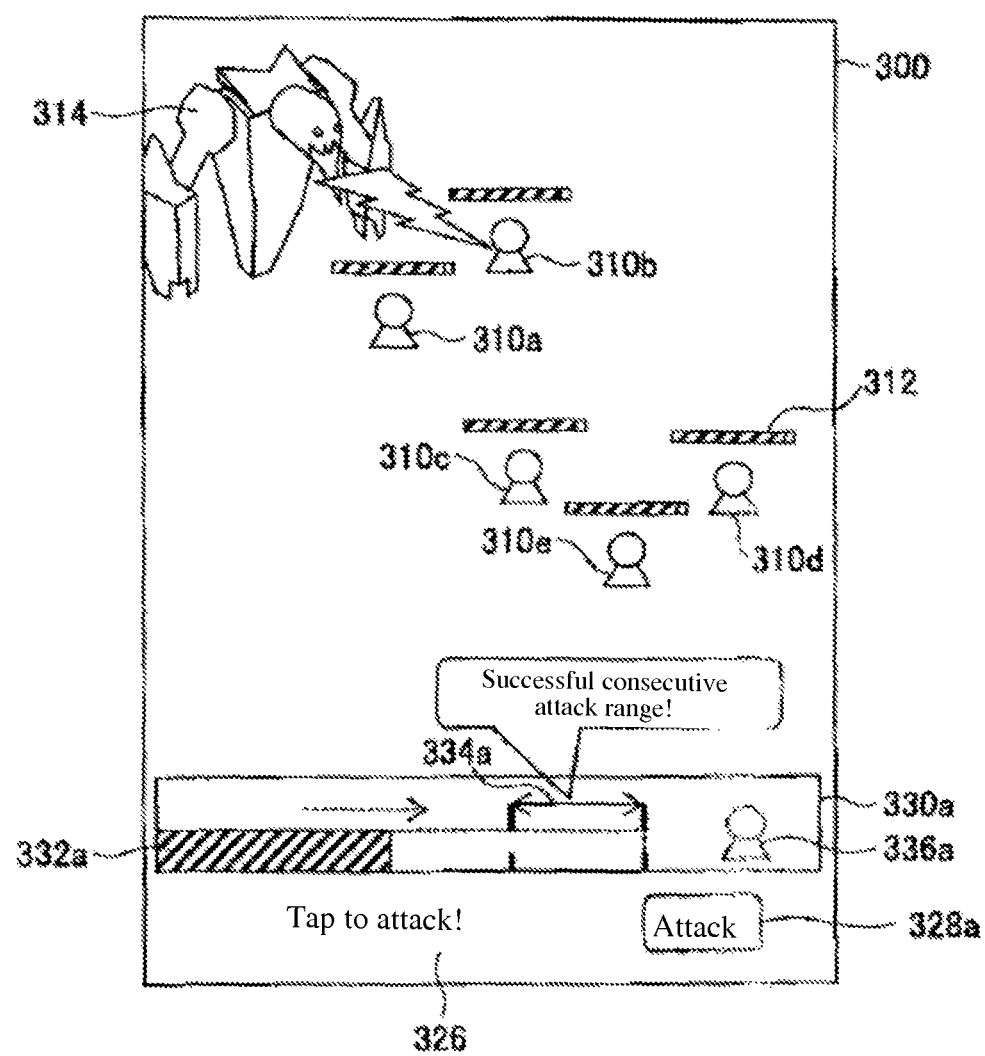
FIG. 20 A diagram illustrating an exemplary game screen in accordance with Embodiment 3.

FIG. 20 is a diagram illustrating a state in which the player character 310a is selected as a second player character and guidance information 330a, which shows the successful consecutive attack timing of the player character 310a, is displayed. The guidance information 330a includes a pictorial image 336a of the player character 310a, an indicator 332a indicating the tension value of the player character 310a, and a successful consecutive attack range 334a. In addition, a message 326, such as "Tap to attack!", and an attack button 328a are displayed on the game screen 300.

Figure 21:
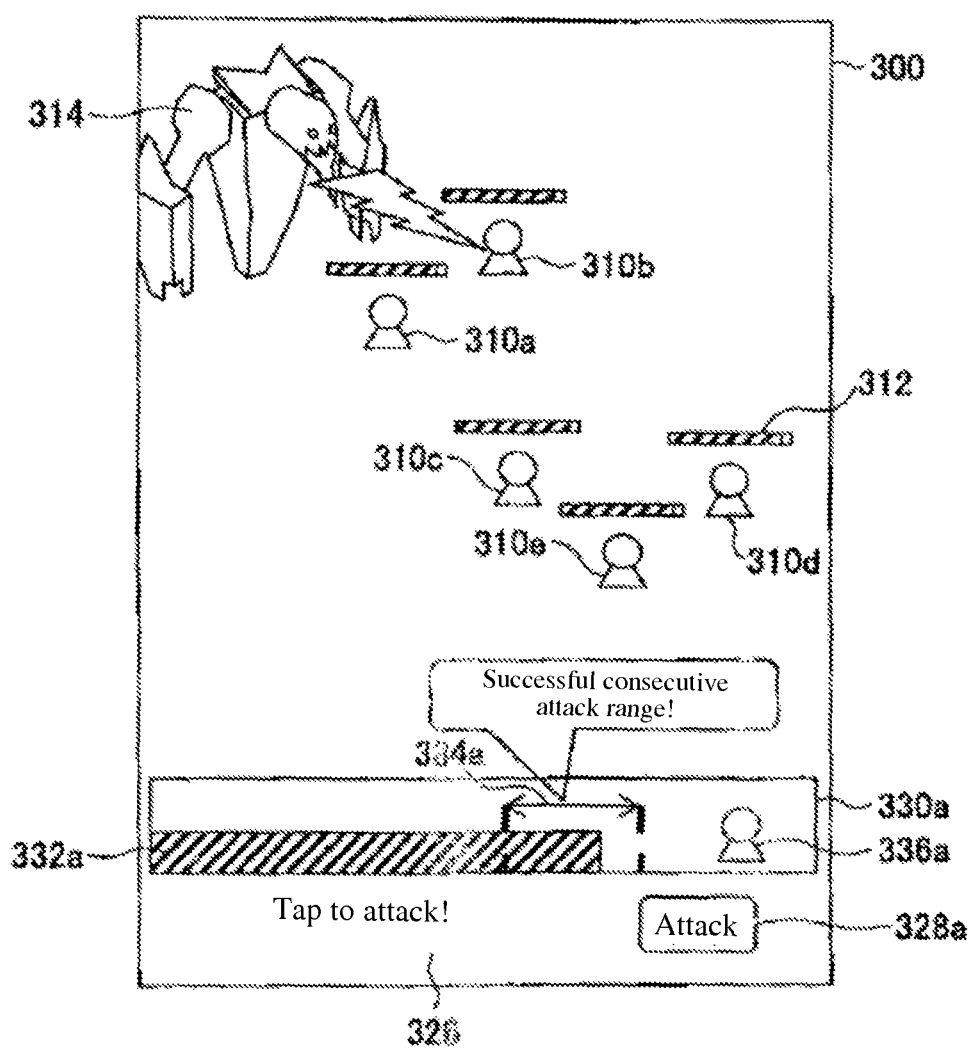
FIG. 21 A diagram illustrating an exemplary game screen in accordance with Embodiment 3.

The indicator 332a of the guidance information 330a increases in the direction of the arrow at a speed configured in the success timing control information storage module 66 in accordance with the value of the affinity parameter of the player character 310a for the player character 310b. FIG. 21 is a diagram illustrating a state in which the indicator 332a increases within the successful consecutive attack range 334a.

The success determination module 52 accepts the timing at which the player presses the attack button 328a as the timing of the second player character's attack against the enemy character (YES in Step S208 in FIG. 26). For example, when the player presses the attack button 328a in accordance with the timing illustrated in FIG. 20, the success determination module 52 determines that said attack timing is a successful consecutive attack timing (YES in Step S210 in FIG. 26). If the attack timing is a successful consecutive attack timing (YES in Step S210), the battle management module 54 executes a process in which serious damage is inflicted on the enemy character 314 (Step S212). On the other hand, if the attack timing is not a successful consecutive attack timing (NO in Step S210), the battle management module 54 executes a process in which ordinary damage is inflicted on the enemy character 314 (Step S214).

Figure 22:
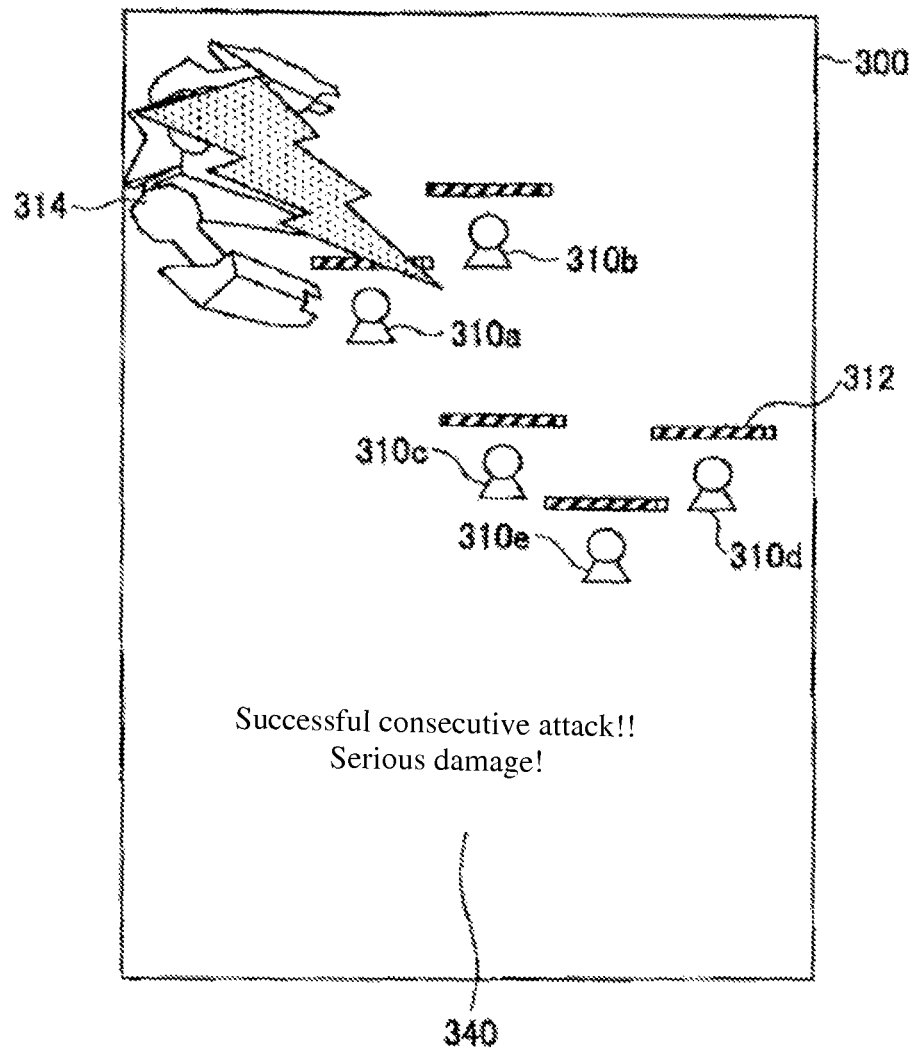
FIG. 22 A diagram illustrating an exemplary game screen in accordance with Embodiment 3.
Figure 23:
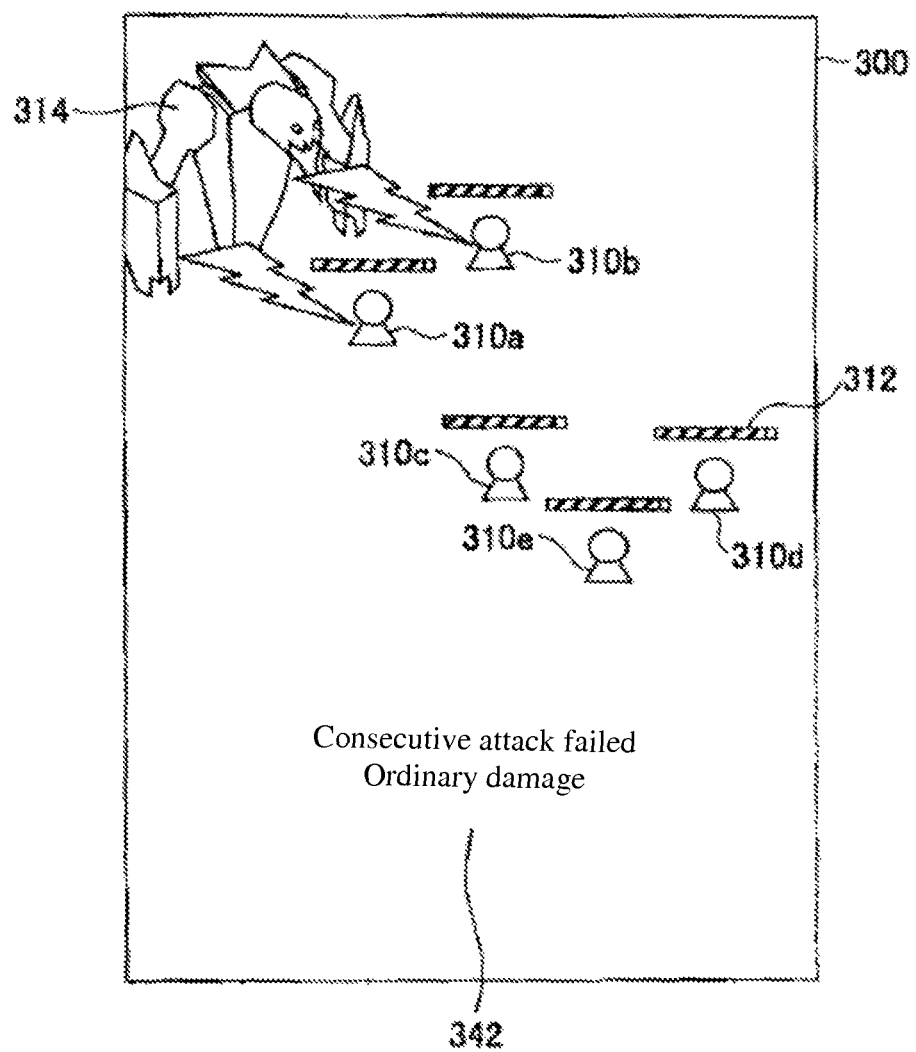
FIG. 23 A diagram illustrating an exemplary game screen in accordance with Embodiment 3.

FIG. 22 illustrates a game screen 300 showing a state in which a consecutive attack is successful and serious damage is inflicted on the enemy character 314. FIG. 23 illustrates a game screen 300 showing a state in which a consecutive attack is unsuccessful and ordinary damage is inflicted on the enemy character 314.

Subsequently, it is determined whether or not to continue the game (Step S216 in FIG. 26), and if it will be continued (YES in Step S216), the procedure goes back to Step S202, the next player character is selected, and the same process is repeated. On the other hand, the process is terminated if the game will not be continued (NO in Step S216).

It should be noted that, as an alternative example, if the attack timing is not a successful consecutive attack timing (NO in Step S210), then, upon inflicting ordinary damage on the enemy character 314 (Step S214), the procedure does not advance to Step S216, it can be assumed that the consecutive attack has failed, and the player's operational input can be rejected for the subsequent player characters. In such a case, player characters can be directed to carry out only ordinary attacks in the order selected by the game management server device 4 as a default.

In addition, an arrangement can be used in which presentation of multiple player character candidates, selection of multiple player characters, and presentation of guidance information about multiple characters can be carried out, for example, in Steps S202 to S206. Specifically, the second player character (310*a*) and third player character (310*e*) may be chosen and selected in Step S202 and Step S204, and guidance information about them may be presented in Step S206. In such a case, for example, the player can control the timing of the attacks by the second player character (310*a*) and third player character (310*e*) in Step S208, and in Step S210 it can be determined whether or not the respective timing of the attacks by the second player character (310*a*) and third player character (310*e*) is successful consecutive attack timing.

Figure 24:
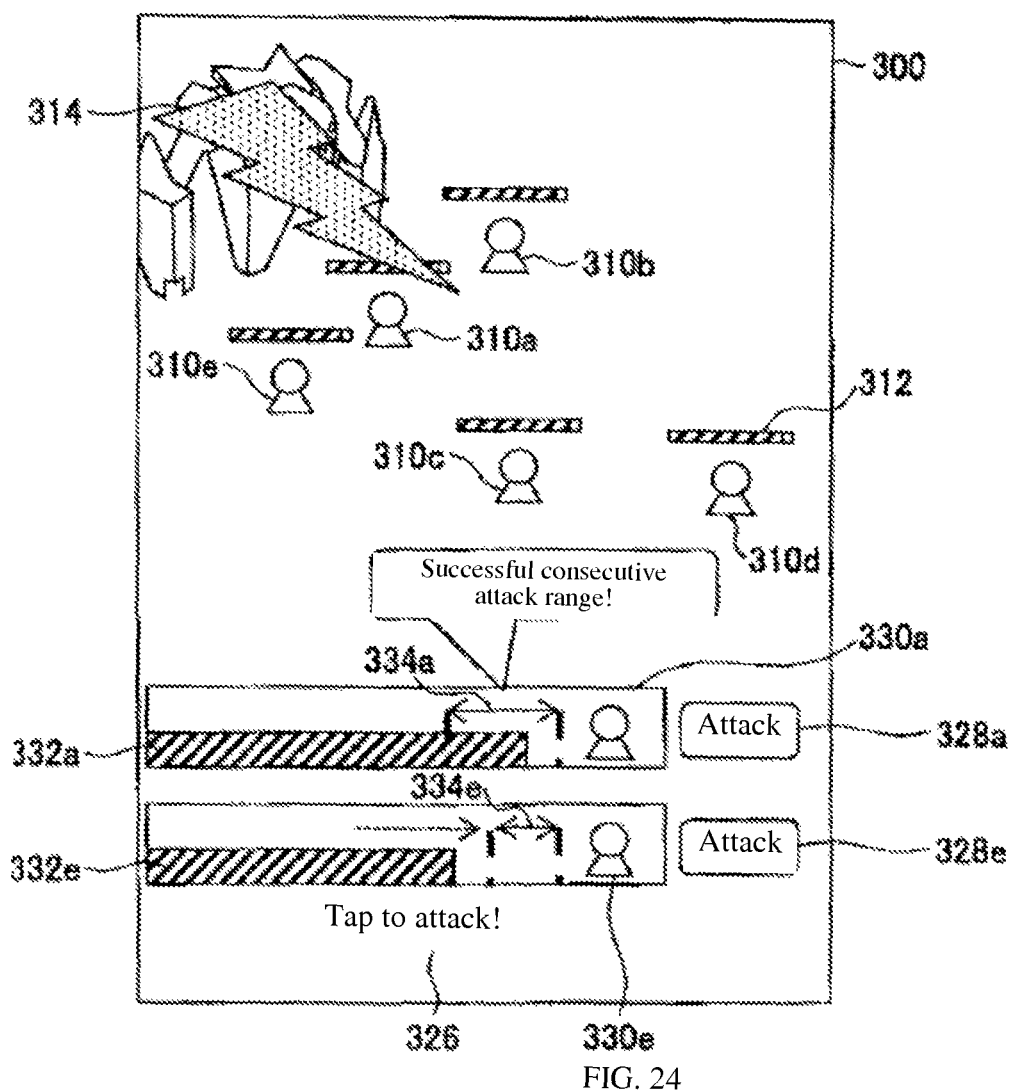
FIG. 24 A diagram illustrating another exemplary game screen in accordance with Embodiment 3.

FIG. 24 is a diagram illustrating an exemplary game screen 300 used in this case. In this case, an attack button 328*e* and guidance information 330*e*, which indicates the successful consecutive attack timing of the player character 310*e*, are displayed on the game screen 300 in addition to the guidance information 330*a*, which shows the successful consecutive attack timing of the player character 310*a*. The guidance information 330*e* includes a pictorial image 336*e* of the player character 310*e*, an indicator 332*e*, which shows the tension value of the player character 310*e*, and a successful consecutive attack range 334*e*.

FIG. 24 illustrates a state in which, after an attack is carried out by the player character 310*a*, an attack is carried out by the player character 310*e*. In this case, the predetermined start timing used for the third player character can be used as the timing of the second player character's attack against the enemy character. However, it is possible to provide various other settings, such as using the predetermined start timing used for the third player character as the timing of the first player character's attack against the enemy character, or the like.

In addition, as another alternative example, an arrangement can be used in which the player controls the attack timing of the second player character (310*a*) in Step S208 in FIG. 26, and if the attack timing of the second player character (310*a*) is found to be a successful consecutive attack timing in Step S210, the procedure goes back to Step S208, and the player controls the attack timing of the third player character (310*e*). In such a case, if the timing of the attack by the second player character (310*a*) is not found to be a successful consecutive attack timing in Step S210, it can be assumed that the consecutive attack has failed, the third player character (310*e*) can be directed to carry out only ordinary attacks, and the subsequent player characters can be directed to carry out only ordinary attacks in the order selected by the game management server device 4 as a default.

As explained above, the game management server device 4 according to the present embodiment can be used to provide a game involving a team of multiple player characters engaged in battle with an enemy character, wherein the player is required to provide operational input corresponding to associations between the multiple player characters.

For example, the player can increase the likelihood of successful consecutive attacks and can gain advantage in the game by selecting a player character for which other player characters have high affinity parameters as the first player character.

In addition, the player can increase the likelihood of successful consecutive attacks and can gain advantage in the game by selecting a player character with a high affinity parameter for the first player character as the second player character.

In addition, the tedium of the player's operational input can be minimized because successful consecutive attack timing varies depending on the affinity parameters, and the like, of the first player character and second player character.

In addition, in the present embodiment, an arrangement can be used in which multiple player characters carry out only ordinary attacks in the order selected by the player or in the order selected by the game management server device 4 as a default before the enemy character described in Embodiment 1 enters a break state, and carry out a series of consecutive attacks described with reference to FIG. 26, for example, after the enemy character enters a break state.

In addition, for example, the predetermined overbreak condition described in Embodiment 1 may refer to the fact that consecutive attacks by a predetermined number of player characters have been successful.

Embodiment 4

This embodiment will be described with reference to the terminal device 1 as the game-providing device. In other words, this embodiment will be described with reference to using the terminal device 1 to execute the process described in Embodiment 3. In the present embodiment, since the system configuration, the hardware configuration of the terminal device 1, and the hardware configuration of the game management server device 4 are the same as those described with reference to FIGS. 1 to 3 in Embodiment 1, they will not be illustrated or described.

Figure 28:
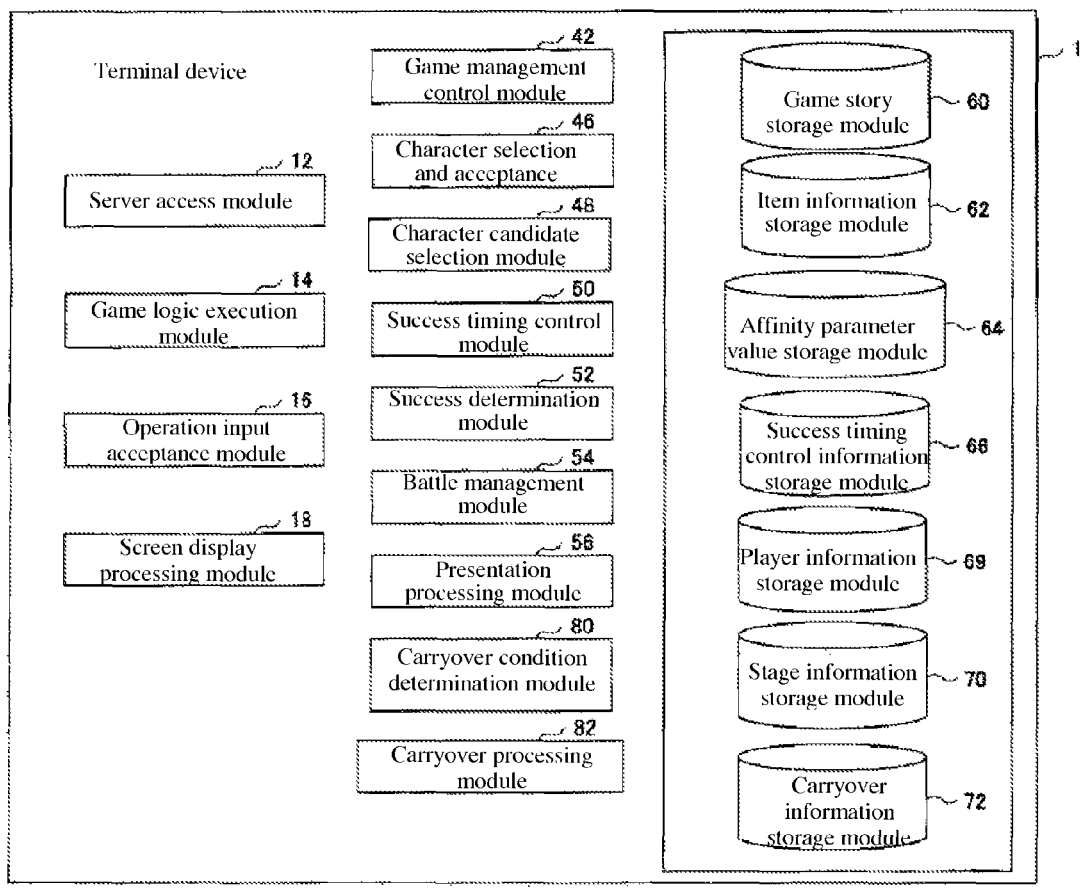
FIG. 28 A block diagram illustrating an exemplary functional configuration of the terminal device in accordance with Embodiment 4.

FIG. 28 is a block diagram illustrating the functional configuration of the terminal device 1 in accordance with the present embodiment. In the present embodiment, an arrangement can be used in which a piece of game application software (application program, such as non-transitory computer-readable medium containing instructions stored in a storage and executable on a hardware device) is downloaded from the game management server device 4 to the terminal device 1 in advance, the game application software is run on the terminal device 1, and processing is performed based on the information contained in the game application software that has been stored in the terminal device 1 via download. However, information can be adapted to be sent and accepted on demand by accessing the game management server device 4 on an as-needed basis. While not illustrated, in the present embodiment, the game management server device 4 can be adapted to contain only some of the constituent elements depicted in FIG. 14, such the player information storage module 68, and the like.

In the present embodiment, in addition to the server access module 12, game logic execution module 14, operational input acceptance module 16, and screen display processing module 18 illustrated in FIG. 14, the terminal device 1 includes a game management control module 42, a character selection and acceptance module 46, a character candidate selection module 48, a success timing control module 50, a success determination module 52, a battle management module 54, a presentation processing module 56, a game story storage module 60, an item information storage module 62, an affinity parameter value storage module 64, a success timing control information storage module 66, and a player information storage module 69. It should be noted that the basic functions of each constituent element are the same as those discussed in Embodiment 3, and description thereof will be omitted as appropriate.

While the player information storage module 69 can be adapted to contain the same information as the player information storage module 68 described with reference to FIG. 14, it can also be adapted to store information relating only to the player using said terminal device 1. In addition, in the present embodiment, the game management server device 4 can be adapted to include the player information storage module 68 in order to manage all the players participating in the game, for example.

In addition, in the present embodiment, an arrangement can be used in which the game story storage module 60, item information storage module 62, affinity parameter value storage module 64, success timing control information storage module 66, and the like are included not in the terminal device 1, but in the game management server device 4, in the same manner as explained in Embodiment 3. In such a case, the terminal device 1 can be adapted to acquire necessary information by accessing the game management server device 4 on an as-needed basis.

It should be noted that the constituent elements of the terminal device 1 and game management server device 4 illustrated in FIG. 4, FIG. 13, FIG. 14, and FIG. 28 constitute a block of functional units, rather than a configuration of hardware units. The constituent elements of the terminal device 1 and game management server device 4 are implemented using discretionary combinations of hardware and software, with particular emphasis on any suitable computer CPUs, memory, software programs implementing the constituent elements of these drawings loaded into the memory, storage units such as hard disks used to store these programs, and a networking interface. In addition, those of skill in the art will appreciate that apparatus and method of their implementation allow for many variations. In addition, it is also possible to use an arrangement in which the functions performed by the game management server device 4 are distributed between multiple devices and do not need to be executed by a single device.

While a number of embodiments of the present invention have been described with reference to the drawings, these embodiments are merely exemplary of the present invention, and various other arrangements may be adopted in addition to the ones described above.

It should be noted that while the above embodiment has been described with reference to a case in which only one enemy character appears in the first battle scene, multiple enemy characters can be adapted to appear in the first battle scene. In such a case, if the predetermined overbreak condition is satisfied, an arrangement can be used in which damage is first inflicted on other enemy characters present in the same battle scene. Next, once all the other enemy characters present in this battle scene have been defeated, damage can be inflicted on the enemy characters of the next battle scene.

In addition, an arrangement can be used in which, once the carryover condition has been satisfied, the carryover processing module 82 simultaneously extends the attack values (second attack values) generated as a result of the player character's attacks against said enemy characters during the predetermined break period when said enemy characters are in the predetermined break state to each enemy character appearing in each battle scene provided subsequent to said first battle scene. In other words, an arrangement can be used in which attacks directed at the enemy characters when said enemy characters are in the predetermined break state are extended not only to the currently appearing enemy characters, but also to the enemy characters configured to appear later.

Figure 25:
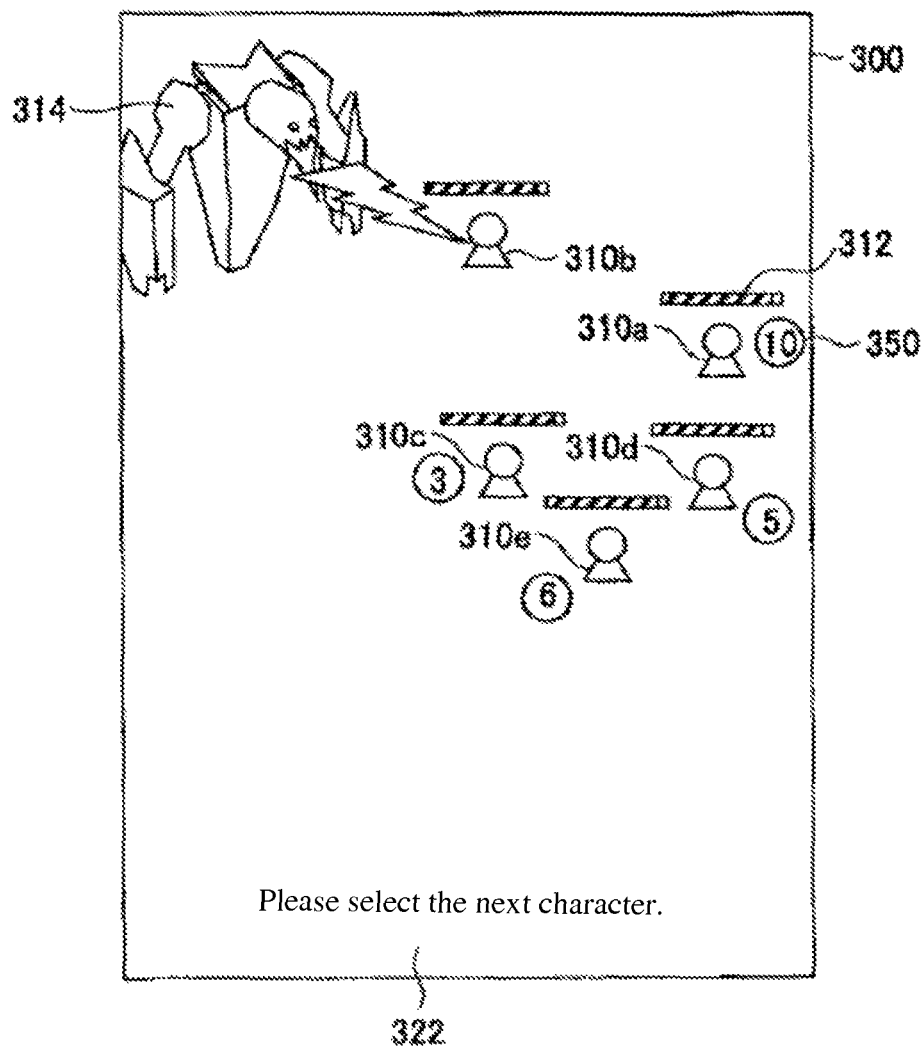
FIG. 25 A diagram illustrating another exemplary game screen in accordance with Embodiment 3.

FIG. 25 is a diagram illustrating yet another example of the game screen 300 in accordance with Embodiment 3. In this example, the presentation processing module 56 displays the affinity parameter values of each one of the player characters other than the first player character for said first player character on the game screen 300. For example, as can be seen in the example illustrated in FIG. 25, the affinity parameter value of the player character 310a for the player character 310b is "10". Accordingly, the player can ascertain which player character's affinity parameter value for the player character 310a (i.e., the first player character) is highest and can select a player character advantageous in terms of game progress in the battle scene.

In Embodiment 3, the way the affinity parameter values are displayed is not limited to the illustrations and, for example, instead of showing the affinity parameter values themselves, it might be possible to give the player some idea of the relative magnitude of the affinity parameter values by displaying numerous heart marks emanating from the player characters with higher affinity parameter values, or having the player characters with higher affinity parameter values energetically jump up and down, and so on.

In addition, in Embodiment 3, the guidance information, which indicates the successful consecutive attack timing of the player character about to attack, is not limited to the information illustrated in FIG. 20 and the like, and may be expressed using circle graph-like gauges or the like, or it may be represented without being limited to visual displays, such as via sounds that make it possible to grasp the successful consecutive attack timing.

In addition, in Embodiment 3, as an alternative example, it is possible to use an arrangement in which the game management server device 4 does not have a character candidate selection module 48, or an arrangement in which the player selects the second player character, and so on.

Furthermore, for example, when the player's operations take time (i.e. when the player is slow to select the next attacking player character, etc.), the enemy character 314 itself may attack.

Furthermore, although Embodiment 1 and Embodiment 3 have used examples in which the game-providing device is the game management server device 4, and Embodiment 2 and Embodiment 4 have used examples in which the game-providing device is the terminal device 1, respectively, it is also possible to use an arrangement in which the constituent elements of the game-providing device are distributed between the terminal device 1 and the game management server device 4.

The manner in which the game is executed, may be either "browser-type" or "application-type". Browser-type execution involves executing a process in which screen transition information (View information), which describes display control content for a series of consecutive screens displayed as the game progresses, is managed by the game management server device 4, and HTML data documents, as well as images and other data associated therewith, are transmitted to the terminal devices in response to data acquisition requests that accompany input operations performed on the terminal devices 1, and are displayed in a web browser on the terminal devices 1. On the other hand, application-type execution involves downloading a piece of game application software (application program, such as non-transitory computer-readable medium containing instructions stored in a storage and executable on a hardware device) in advance to a terminal device 1 from the game management server device 4, running said game application software on the terminal device 1, and then generating and displaying screen information based on screen transition information contained in the game application software stored in the terminal device 1 via download and data acquired from the server in response to input operations.

DESCRIPTION OF REFERENCE NUMERALS

1 Terminal device
2 Access point
3 Network
4 Game management server device
12 Server access module
14 Game logic execution module
16 Operation input acceptance module
18 Screen display processing module
42 Game management control module
46 Character selection and acceptance module
48 Character candidate selection module
50 Success timing control module
52 Success determination module
54 Battle management module
56 Presentation processing module
60 Game story storage module
62 Item information storage module
64 Affinity parameter value storage module
66 Success timing control information storage module
68 Player information storage module
69 Player information storage module
70 Stage information storage module
72 Carryover information storage module
80 Carryover condition determination module
82 Carryover processing module

The invention claimed is:

1. A game-providing device comprising:
a processor, configured to:
sequentially provide a player with a game that includes a plurality of sequential battle scenes, each of the plurality of sequential battle scenes respectively featuring an enemy character that appears therein as an opponent of a player character such that when the player clears one of the plurality of sequential battle scenes, a subsequent sequential battle scene of the plurality of sequential battle scenes is provided to the player;
determine whether or not a carryover condition has been satisfied such that attacks by the player character against the enemy character, which are carried out by the player character in a first battle scene of the plurality of sequential battle scenes against the enemy character, is extended to subsequent enemy characters that are configured to appear in subsequent ones of the plurality of sequential battle scenes; and
once the carryover condition has been satisfied,
sequentially execute a process that, before generation of the subsequent battle scene with a subsequent enemy character, uses a first attack value generated as a result of the attacks by the player character against the enemy character in the first battle scene to offset defeat parameter values required to defeat the subsequent enemy characters that are configured to appear in each of the subsequent ones of the plurality of sequential battle scenes, skip the appearance of the subsequent enemy characters having defeat parameter values reduced to zero, and causes another enemy character from the subsequent enemy characters that is subsequent to the skipped ones of the subsequent enemy characters to appear in a state in which a defeat parameter value of said another enemy character from the subsequent enemy characters has been offset.

2. The game-providing device according to claim 1, wherein the carryover condition implies that after a first break value generated as a result of the player character's attacks against the enemy character in the first battle scene reaches a break parameter value required to place said enemy character into a predetermined break state configured in said enemy character, the player character's attacks against said enemy character during a predetermined break period when said enemy character is in the predetermined break state satisfy a predetermined overbreak condition.

3. The game-providing device according to claim 2, wherein the predetermined overbreak condition implies that a second break value generated as a result of the player character's attacks against said enemy character during the predetermined break period when the enemy character is in the predetermined break state reaches the break parameter value configured in said enemy character.

4. The game-providing device according to claim 2, wherein, once the carryover condition has been satisfied, the processor is configured to simultaneously extend second attack values generated as a result of the player character's attacks against said enemy characters during the predetermined break period when the enemy characters are in the predetermined break state to each of the enemy characters appearing in each of the battle scenes provided subsequent to said first battle scene.

5. The game-providing device according to claim 1, wherein once the carryover condition has been satisfied, the processor is configured to sequentially execute a process that uses an excess value, by which the first attack value exceeds the defeat parameter value configured in said enemy character appearing in said first battle scene, to offset the defeat parameter values configured in each of the enemy characters appearing in each of the subsequent ones of the plurality of subsequent battle scenes until said excess value is reduced to zero, skips the appearance of the enemy characters whose defeat parameter values have been reduced to zero and, additionally, causes the subsequently appearing enemy character to appear in a state in which the defeat parameter value of said enemy character has been offset by said excess value.

6. The game-providing device according to claim 1, wherein the processor is configured to cause the another enemy character from the subsequently appearing enemy characters to appear and be provided to the player in the battle scene in which said enemy character is originally configured to appear.

7. The game-providing device according to claim 1, wherein the processor is configured to cause the another enemy character to appear and be provided to the player in said first battle scene.

8. The game-providing device according to claim 1, wherein the game-providing device is a terminal device of the player and the processor is configured to provide the battle scenes to a display of said terminal device.

9. The game-providing device according to claim 1, wherein the game-providing device is a game management server device connected to a terminal device of the player over a network and the game management control module provides the battle scenes to the terminal device of the player.

10. A non-transitory computer-readable medium containing instructions
stored in a storage
and executable on a hardware device, the instructions comprising:
sequentially providing a player with a game that includes a plurality of sequential battle scenes, each of the plurality of sequential battle scenes respectively featuring an enemy character that appears therein as an opponent of a player character such that when the player clears one of the plurality of sequential battle scenes, a subsequent sequential battle scene of the plurality of sequential battle scenes is provided to the player;
determining whether or not a carryover condition has been satisfied such that attacks by the player character against the enemy character, which are carried out by the player character in a first battle scene of the plurality of sequential battle scenes against the enemy character, is extended to subsequent enemy characters that are configured to appear in subsequent ones of the plurality of sequential battle scenes; and
once the carryover condition has been satisfied, sequentially executing a process that, before generation of the subsequent battle scene with a subsequent enemy character, uses a first attack value generated as a result of the attacks by the player character against the enemy character to offset defeat parameter values required to defeat the subsequent enemy characters that are configured to appear in each of the subsequent ones of the plurality of sequential battle scenes, skip the appearance of the subsequent enemy characters having defeat parameter values reduced to zero, and causes another enemy character from the subsequent enemy characters that is subsequent to the skipped ones of the subsequent enemy characters to appear in a state in which a defeat parameter value of said another enemy character from the subsequent enemy characters has been offset.

* * * * *